(12) United States Patent
Morita

(10) Patent No.: US 12,254,227 B2
(45) Date of Patent: Mar. 18, 2025

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Keisuke Morita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/896,505

(22) Filed: Aug. 26, 2022

(65) Prior Publication Data

US 2023/0068385 A1    Mar. 2, 2023

(30) Foreign Application Priority Data

Sep. 1, 2021 (JP) .................................. 2021-142452
Mar. 25, 2022 (JP) .................................. 2022-049401
Aug. 10, 2022 (JP) .................................. 2022-128221

(51) Int. Cl.
*G06F 3/12* (2006.01)

(52) U.S. Cl.
CPC .......... *G06F 3/1225* (2013.01); *G06F 3/1205* (2013.01); *G06F 3/1238* (2013.01); *G06F 3/1258* (2013.01)

(58) Field of Classification Search
CPC .... G06F 3/1225; G06F 3/1205; G06F 3/1238; G06F 3/1258; G06F 3/1285
See application file for complete search history.

(56) References Cited

U.S. PATENT DOCUMENTS

| | | | |
|---|---|---|---|
| 2010/0238494 A1* | 9/2010 | Araki | G06F 3/1204 358/1.15 |
| 2014/0211244 A1* | 7/2014 | Murakami | G06F 8/61 358/1.15 |
| 2016/0026416 A1* | 1/2016 | Kikuchi | G06F 3/1203 358/1.15 |
| 2016/0094597 A1* | 3/2016 | Nishida | H04L 65/4038 709/204 |
| 2020/0120149 A1* | 4/2020 | Park | H04L 65/4015 |
| 2021/0055897 A1* | 2/2021 | Tomihisa | H04L 51/10 |
| 2021/0232352 A1* | 7/2021 | Komatsu | G06F 3/1229 |

FOREIGN PATENT DOCUMENTS

JP    2019071038 A    5/2019

\* cited by examiner

*Primary Examiner* — Huo Long Chen
(74) *Attorney, Agent, or Firm* — ROSSI, KIMMS & McDOWELL LLP

(57) ABSTRACT

When a plugin call button is pressed via a print menu of an application linked to a business chat service, information of a print plugin is acquired, the print plugin is selected based on the information, and when a print operation is accepted, printing of a file displayed by the application is instructed to the selected print plugin. The print plugin transmits a print job to a print service in response to the print instruction.

12 Claims, 22 Drawing Sheets

FIG. 4

| User ID | 11111111-2222-... | |
|---|---|---|
| | Group ID | 22222222-aaaa-... |
| | | 22222222-bbbb-... |
| | | ⋮ |
| | Channel ID | 33333333-aaaa-... |
| | | 33333333-bbbb-... |
| | | ⋮ |
| | Domain Name | printsystem.com |
| | ⋮ | ⋮ |

FIG. 5

| User ID (Group ID) | 12345678-1234-··· |
|---|---|
| Plugin ID | abcdefgh-1234-··· |
| App ID | XXXXXXXX-1111-··· |
| display name | CloudPrint Plugin |
| version | 1.2.34 |
| description | This app provides··· |
| modified date time | 2000/1/23 |
| create by | ABC corp |
| plugin type | Print |
| ⋮ | ⋮ |

| Owner ID | 11111111-2222-... | 22222222-aaaa-... | 22222222-bbbb-... | ... |
|---|---|---|---|---|
| Printer ID | 12345678-abcd-... | 24242424-abab-... | 24682468-aabb-... | ... |
| Printer Name | CloudPrinter001 | CloudPrinter002 | CloudPrinter003 | ... |
| ... | ... | ... | ... | ... |

FIG. 7

| Printer ID | 12345678-abcd-··· |
|---|---|
| Printer Name | CloudPrinter001 |
| Model Name | iRC 1234 |
| Status | Ready |
| GPS | 35.9030259,140.0510963 |
| Street address | 7-5-1, Hakusan, Toride Shi··· |
| Postal code | 302-0023 |
| ⋮ | ⋮ |
| Duplex | Duplex |
| Color | Monochrome |
| Staple | TRUE |
| ⋮ | ⋮ |

INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an information processing apparatus which provides a service with a file sharing function such as business chat, a control method of the information processing apparatus, and a storage medium.

Description of the Related Art

In recent years, message exchange using business chat in business has become widespread, and the conventional business has been shifted to business using business chat. For example, when a file is attached to a message, not only can the file be viewed on the spot without downloading the file, but it is also possible to edit the file and share the edited contents with another user.

However, with respect to printing, a conventional method of performing printing by downloading is often adopted, and even if printing appears to be performed by a system on the Web on the surface, conventional local printing is called after being internally converted into print data.

In the process of calling the local printing in this way, it is necessary to set up a printing environment in advance in a browser or a system, and there is an aspect that the process is not suitable with an Operating System (OS) not suitable for printing or a mobile terminal such as a smartphone.

Therefore, it is preferable to use a print system independent of the environment by using an external cloud print service instead of local printing. The cloud print service in this case is, for example, a service known as Google Cloud Print (registered trademark), Microsoft Universal Print (registered trademark) or the like. On the other hand, by introducing a plugin for printing on a business chat and requesting printing, it is possible to introduce a printing environment without setting up local printing.

For example, Japanese Patent Application Laid-Open No. 2019-71038 allows a system to automatically load a suitable plugin by calling one of the plugins incorporated in the system in advance.

However, since plugins are incorporated with various kinds of functions according to the extensibility of the system, the user may not know which one to choose simply by "listing everything and letting the user choose".

The present invention is directed to provide a user with a plugin corresponding to an application opening a file shared by a service having a file sharing function such as a business chat system.

SUMMARY OF THE INVENTION

According to an aspect of the present invention, an information processing apparatus providing a service with file sharing function comprises a memory and at least one processor in communication with the memory, wherein the at least one processor is configured to perform: acquiring information of a plugin callable from the service and adding a print function to the service; controlling an application to display a file shared on the service by performing an application on the service; selecting the plugin based on the acquired information in a case where the plugin is called by operating via a user interface related to a print function of the application displaying the file; and operating the selected plugin to print the file displayed by the application, wherein the plugin transmits, to a print service, a print job to print the file displayed by the application according to the operation of printing the file.

Further features of the present invention will become apparent from the following description of exemplary embodiments with reference to the attached drawings.

BRIEF DESCRIPTION OF THE DRAWINGS

FIG. 4 illustrates user management information in the business chat service.

FIG. 5 illustrates user management information in the print plugin.

FIG. 6 illustrates printer management information in the print plugin.

FIG. 7 illustrates printer management information in a cloud print service.

DESCRIPTION OF THE EMBODIMENTS

Hereinafter, embodiments of the present invention will be described with reference to the drawings.

First Embodiment

Figure 1:
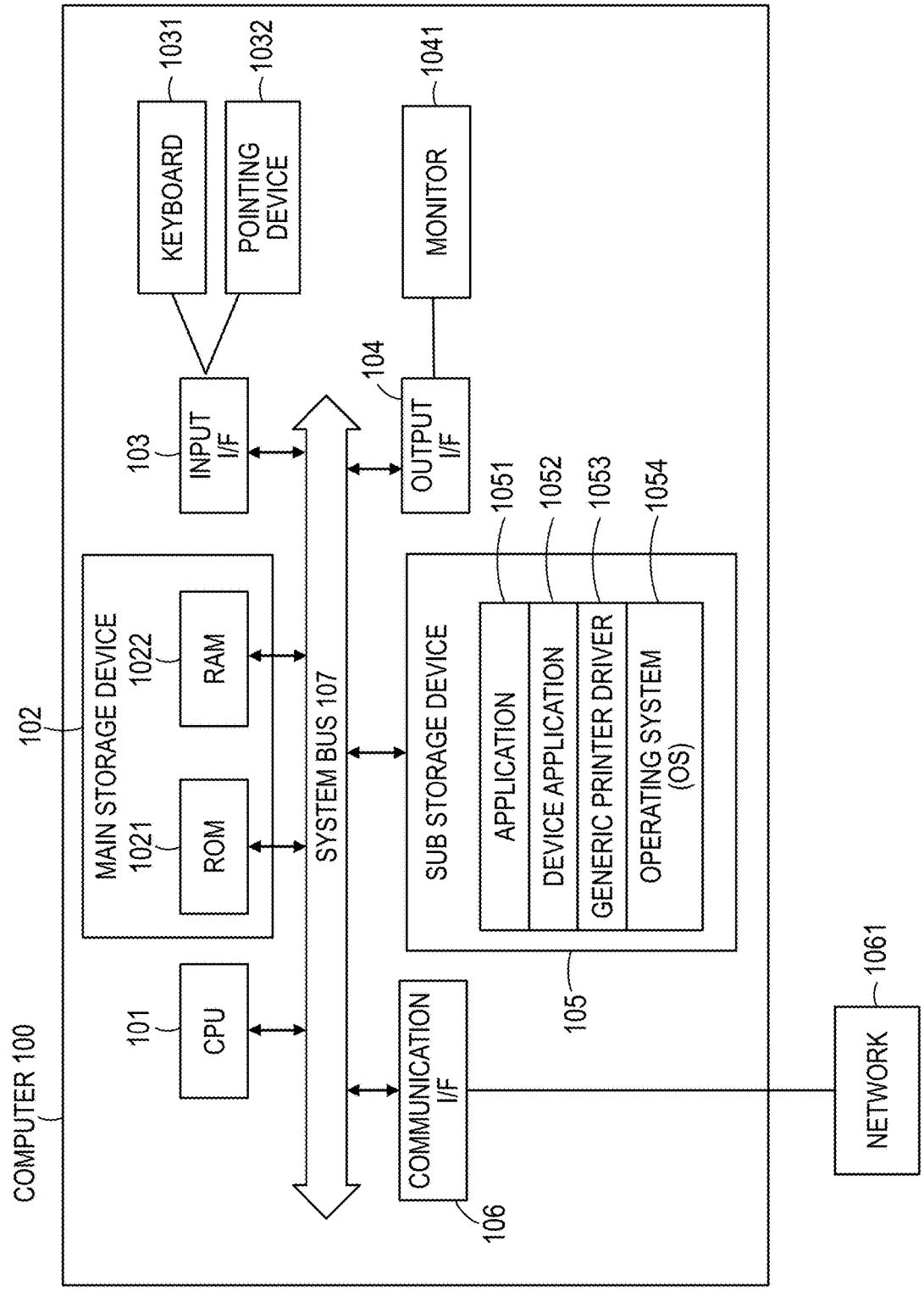
FIG. 1 illustrates a hardware configuration diagram of a general computer in the present embodiment.

FIG. 1 is a diagram illustrating a hardware configuration of a general computer (information processing apparatus)

showing an embodiment of the present invention. The present invention can be applied to a single function, a system consisting of a plurality of apparatuses, or a system connected through a network for processing, as long as the functions of the present invention are executed unless otherwise specified.

A CPU (Central Processing Unit) 101 controls an entire computer 100 according to a program stored in a main storage device 102 or a sub storage device 105.

The main storage device 102 includes a ROM (Read Only Memory) 1021, a RAM (Random Access Memory) 1022, and the like. The RAM 1022 is also used as a work area when the CPU 101 performs each process.

The sub storage device 105 stores various programs such as a software application (application) 1051, a device application (device application) 1052, a generic printer driver 1053, and an operating system (OS) 1054.

Input devices such as a keyboard 1031 and a pointing device 1032 represented by a mouse, a touch panel, a touchpad and the like are connected to the computer 100 through an input interface (I/F) 103. An operation to a program from a user is received through these input devices.

An output device such as a monitor 1041 is connected to an output I/F 104, and a UI is displayed on the monitor according to an instruction of the program. In some terminals such as smartphones and tablet terminals, the pointing device 1032 and the monitor 1041 are integrated, but they are described separately for each role, and may be replaced.

Figure 2:
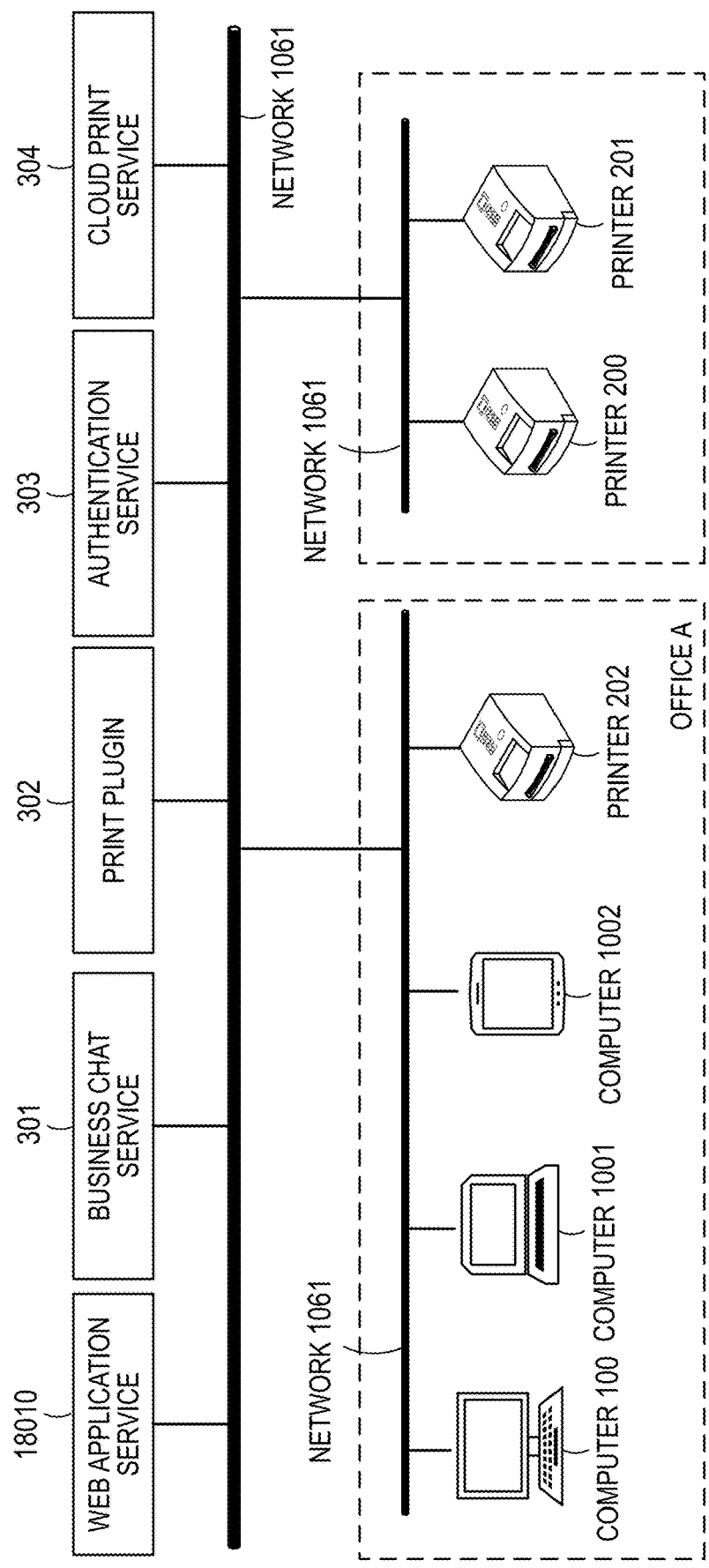
FIG. 2 illustrates a simplified view of a network environment in the present embodiment.

A communication I/F 106 is connected to a network 1061 and can communicate with external devices of the computer 100, for example, a computer 1001, a computer 1002, and a printer 202 shown in FIG. 2.

The modules are connected by a system bus 107, and data can be exchanged between the modules. The application 1051, the device application 1052, the generic printer driver 1053, and the OS 1054 including the processing according to the present embodiment can be added to the sub storage device 105 via a CD-ROM or a USB storage device (not shown). They may also be added to the sub storage device 105 via the network 1061. The present invention can be applied regardless of the configuration of the apparatus if the functions of the present invention can be performed, unless otherwise specified. The system may be a single device, a system comprising a plurality of devices, or a system connected via a local network to perform processing.

FIG. 2 is a simplified view of the environment of the network 1061 in the present embodiment.

In the network 1061, the computer 100/1001/1002 for creating a document or an image to be printed are connected to one or a plurality of networks. Further, the printer 202 may be connected to a single network or to a plurality of networks, or may be connected to the computer 100/1001/1002 via USB. In addition, the computer 100 is connected to a web application service 18010, a business chat service 301, a print plugin 302, an authentication service 303, and a cloud print service 304 on the network. The computer 100 can communicate with a printer 200 and a printer 201 under another network management by passing them.

The personal area network (PAN), LAN, and other small to large networks are available, and these devices are connected to all the networks. A server or printer may be connected via the Internet, such as a cloud. The communication system in this case may be wireless LAN communications conforming to the IEEE 802.11 standard. The communication system may be Bluetooth (registered trademark) communications, cellular phone lines conforming to the International Mobile Telecommunication 2000 (IMT-2000) standard, or the like. The communication system shall not be particularly limited. In addition, the USB may be relayed by a USB hub or an exchange other than a direct connection.

Figure 3:
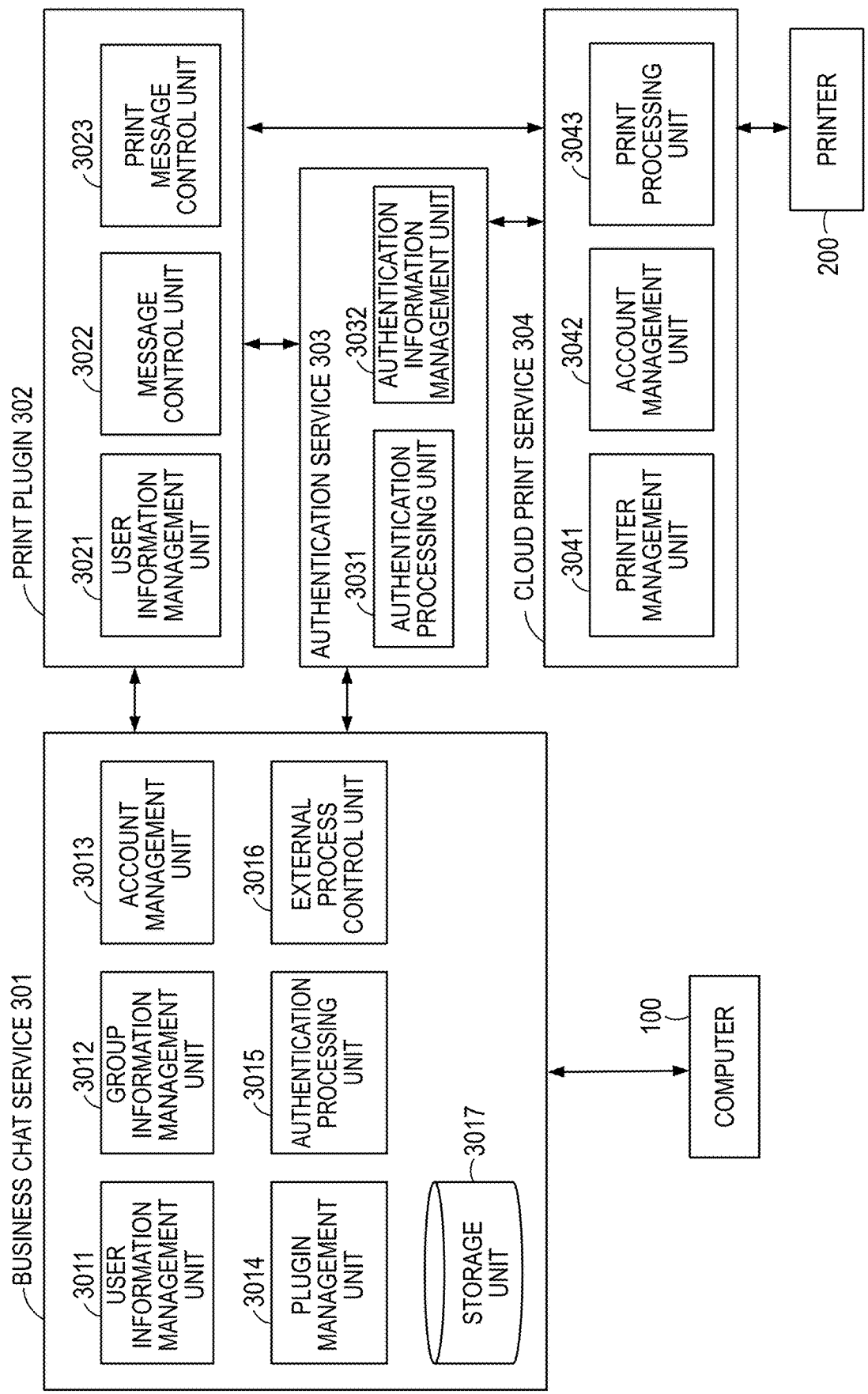
FIG. 3 illustrates a configuration of a system for executing printing by calling a print plugin from a business chat service in the first embodiment.

FIG. 3 is a diagram illustrating a configuration of a system for executing printing by calling the print plugin from the business chat system considered in the present embodiment.

Figure 10:
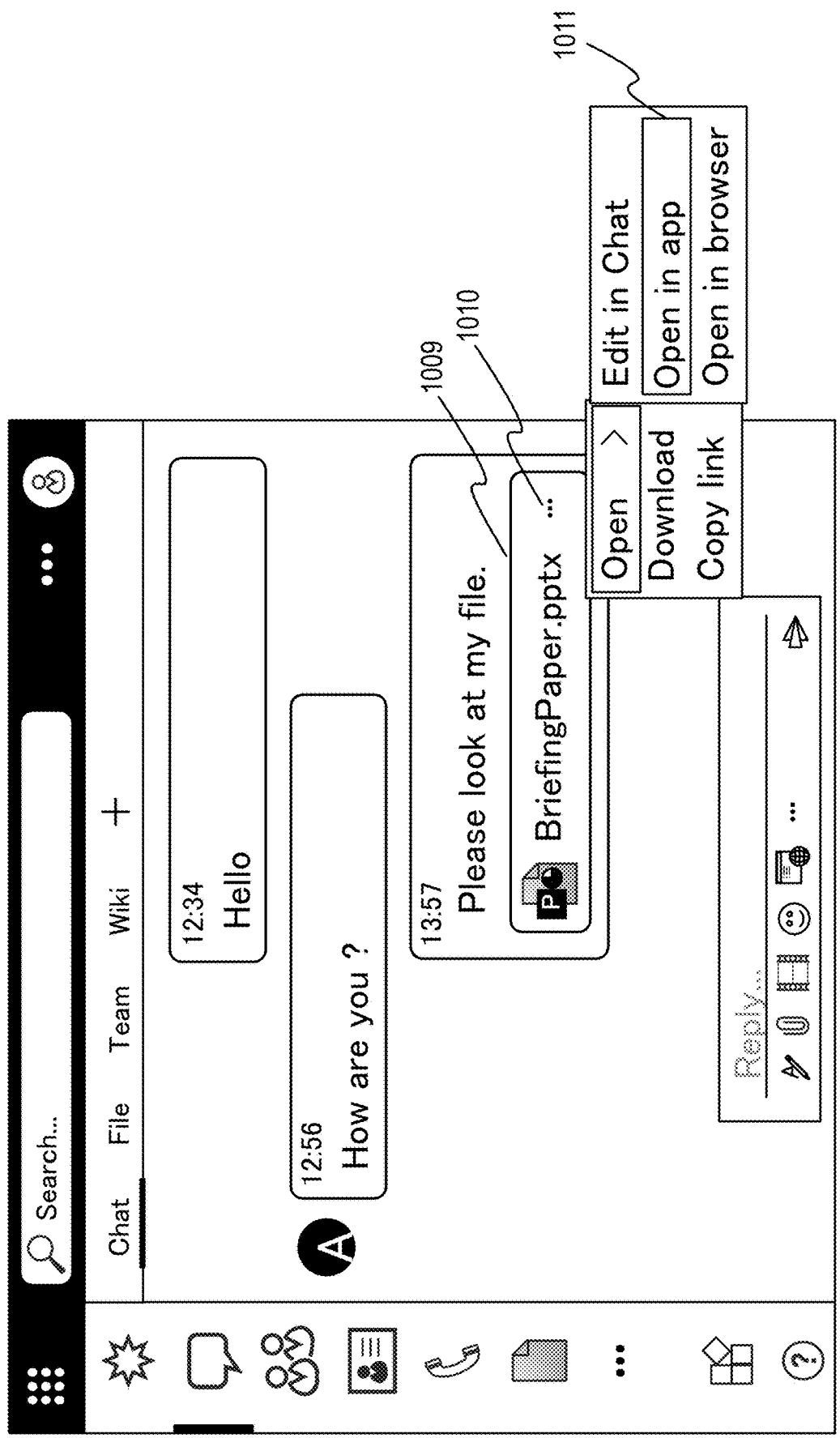
FIG. 10 illustrates a chat screen of the business chat service.

First, as an outline, the user accesses the business chat service 301 to perform business. The business chat service 301 is a service, as shown in FIG. 10, which provides characters and file exchanges through chat with other users and groups. The business chat service 301 has a file sharing function for sharing data uploaded by the user to a server used by the service with other users. In the present embodiment, as an example, a method of accessing an application from the chat function will be described as a basis. But the application may be accessed from a web conference using video calls, functions to view and access the contents of file storage in the cloud, or calendar functions for managing user calendars.

When the user performs printing, the print plugin 302 is called from the business chat service 301, and a print job is submitted to the cloud print service 304, so that the print result can be received by the printer 200. In this case, the print plugin 302 may be deployed on the business chat service 301 or the external network as other services (deployed as other services in a computer resource communicable via the network). The authentication service 303 performs user authentication for accessing the business chat service 301 and the cloud print service 304 and permits the respective services with the authority thereof to facilitate cooperation between the services.

The internal configuration of each service will be described below.

First, the business chat service 301 will be described.

The following functions of the business chat service 301 are realized by the CPU of one or more computers implementing the business chat service 301 reading out and executing a program stored in a storage device.

A user information management unit 3011 manages information on chat performed by the user and file information (access authority of the file and a place where the file exists) of the user. Specifically, as shown in FIG. 4, the user information management unit 3011 first stores and manages information on which group or channel the user belongs and information on the domain to which the user belongs. Since the user can belong to a plurality of groups and channels, the user information management unit 3011 stores IDs for the number of teams to which the user belongs. Further, the detailed information is managed as shown in FIG. 5 in association with the ID of the user or group and can be referred to. In addition, in the user information management unit 3011, data related to individual users including user schedule information and management information of conference rooms and equipment are managed for each user.

A group information management unit 3012 has basically the same functions as those of the user information management unit 3011, such as having chat performed in the group and file information held by the group, but also has a function of handling accesses from a plurality of users having access rights. The group information management unit 3012 also manages data associated with the group, such as memos and recorded data of meetings held in the group.

An account management unit 3013 manages which group the user belongs to, what kind of authority and role the user is given in the range, and performs appropriate access permission as necessary.

A plugin management unit 3014 manages information of plugins available in the business chat service 301. This function is accessed by users and groups, respectively, and plugins corresponding to each user and group are managed as a list. By this function, both plugins owned by the group to which the user belongs and plugins owned by the user himself/herself are enumerated and can be used when accessed. As specific data, as shown in FIG. 5, information such as an ID of the plugin, an ID of the application to which the plugin belongs, a display name, and the like are stored with respect to an ID identifying the user or the group. If the plugin requires more detailed information, such as groups or channels within groups, in addition to application information, these IDs may be included.

Plugins include basic functions such as calling, meeting functions, file management, applications for editing documents and spreadsheets, and cloud storage access and management. The plugins also include files in a specific business dependent format such as CAD, and a viewer for the purpose of playing multimedia messages including videos. The plugins may also include functions of creating personal to-dos, task management for creating, assigning, and tracking tasks shared by individuals and teams. In the present embodiment, among these functions, a print plugin compatible with and usable by an external cloud print service is handled.

The information on the types of these plugins is stored as a plugin type 501 shown in FIG. 5, and by referring to the plugin type 501, it is possible to extract or search for a specific type of plugin. The information of the plugin type 501 stores information such as "Application" if the plugin operates independently as an application, and "Storage" if the plugin is related to a storage such as cloud storage. Information such as "Viewer" for a viewer and "Task" for task management is stored. In the case of the print plugin of the present embodiment, information "Print" related to printing is stored in the information of the plugin type 501.

The plugin may be disposed on the business chat service 301 or may exist as the external service, and may take a form in which the plugin management unit 3014 manages information such as an ID or URI (Uniform Resource Identifier) for access and calls the service appropriately. It makes it easier to update plugin-only or to incorporate third-party plugins.

In addition, the plugin may be in a store managed by the business chat service 301, or may be a compatible service function, such as a plugin that users upload locally and share with individuals or teams.

If the plugin has been placed in the store, it can be used by visiting the store page of the business chat service 301 existing inside or outside the application, selecting the plugin from the list, and performing "add". Internally, the "Plugin ID" in the definition file of the plugin shown in FIG. 5 is associated with the user ID of the user information management unit 3011. If the user is the group manager of the business chat service 301, the plugin can be added as a group, not as a user, by "adding as a group". Internally, the group ID is stored in association with the "Plugin ID" of the plugin to be "added" in the group information management unit 3012. Since the plugin added as a group is displayed as an icon or a menu selection on the screen of the business chat if the user belongs to the group, the plugin can be used without performing an addition operation by the user.

Also, by uploading the plugin from the local computer, the same operation as "adding" may be performed directly. In this case, it is assumed that the plugin includes data equivalent to that in FIG. 5 as setting data such as a manifest.

In addition, the administrator can add definition information including plugins and rules to the group separately introduced from the management page. In this case, the functionality of the plugin is provided according to the rules described (for example, some functions should be hidden).

An authentication processing unit 3015 is a function that enables the integrated management of user account information such as authentication and authentication information for a plurality of services, and performs authentication processing using an ID and a password from the user and processing for giving appropriate authorization to a service whose authority is requested.

Figure 11:
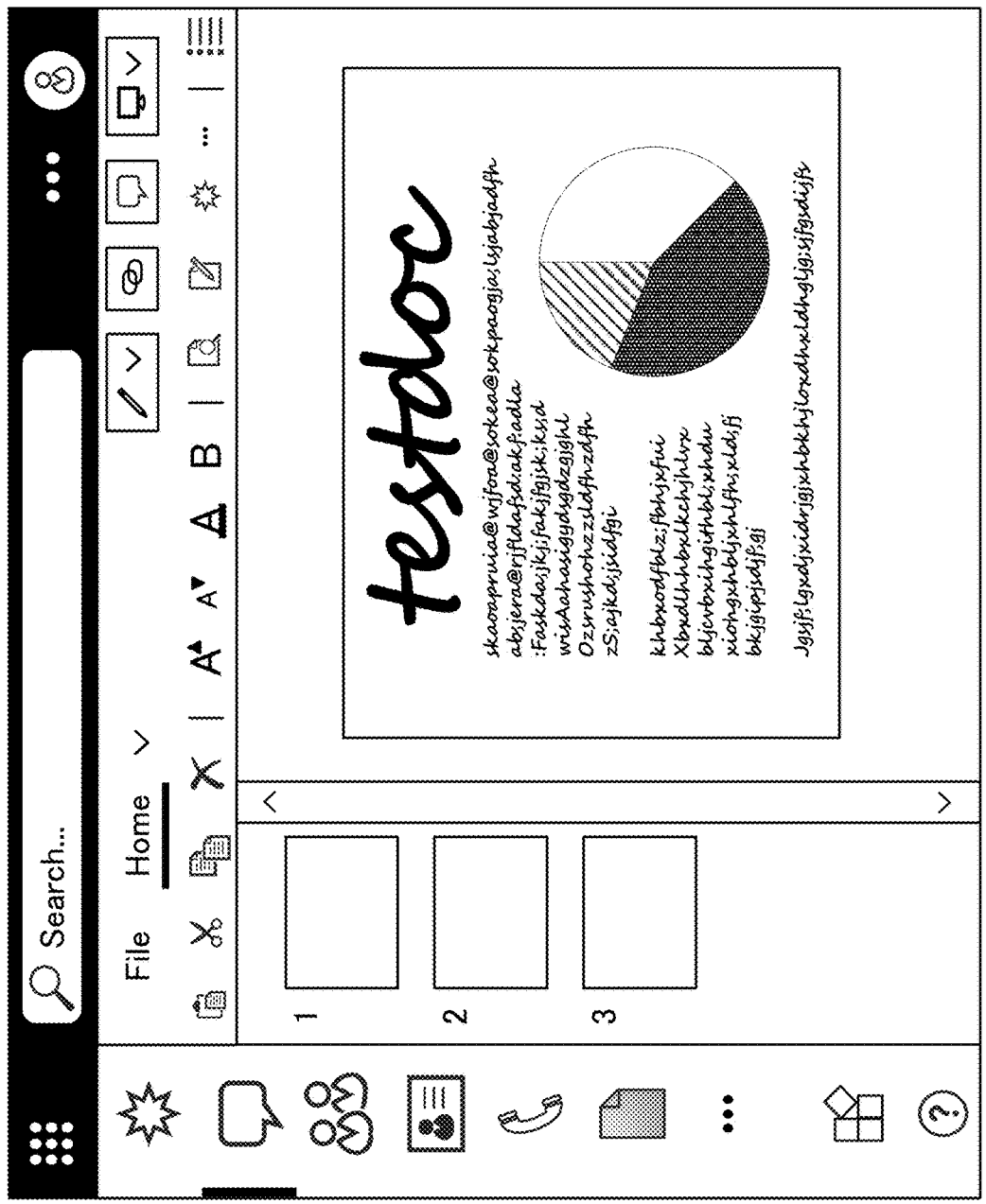
FIG. 11 illustrates an application launch screen on the business chat service.

An external process control unit 3016 performs processing for operating an external program or a Web page inside the business chat service 301. In the present embodiment, the external process control unit 3016 executes a presentation application in the business chat as shown in FIG. 11. With respect to this operation, a Web application may be operated using a built-in function for operating a Web page such as WebView. The desktop application may also be run in a temporary simulator that internally runs the virtual environment, such as Windows sandbox (trademark). Further, the application operating inside can receive a notification of parameter transfer, event notification, or user request such as POST or GET from the business chat service 301 via the external process control unit 3016. The application operating inside can also receive hardware information such as location information and device rotation from the business chat service 301. Thus, the application operating inside can automatically perform authentication by sharing authentication information in the business chat service 301. In this way, the application operating inside can also operate in a dedicated startup mode including a download function of the business chat service 301 or a unique function such as kicking as an external program by receiving a parameter at startup. In addition, the business chat service 301 can receive a notification of an event or a message from the application operating inside the business chat service 301. Furthermore the business chat service 301 can receive a notification to a user such as an alert to be displayed on the business chat service 301 from the application operating inside the business chat service 301.

A storage unit 3017 stores file information uploaded to the business chat service 301. Here, the storage unit 3017 may store the file or the reference information such as a link to the file is managed, so that the type of file information is not particularly limited.

Next, the print plugin 302 will be described.

The CPU of one or more computers implementing the print plugin 302 reads and executes a program stored in the storage device to realize the following functions and operations of the print plugin 302.

A user information management unit 3021 manages information that the print plugin 302 has for each user. Specifically, the user information management unit 3021 stores the printer ID and printer name as shown in FIG. 6. By using the information, it is possible to acquire printer information as shown in FIG. 7 stored in a printer management unit 3041 on the cloud print service 304. Specifically, the printer information includes a device name of the printer, status information such as "ready" and "in process", and capability information such as the printer being capable of printing "color" and being capable of printing with "staples". In addition, the user information managed by the print plugin 302 includes temporary information such as a response in a conversation (for example, response "yes" to a question "do you want to print it?") and history data such as a default printer of the user, setting data used for print, and printing date and time.

A message control unit 3022 performs processing for communicating with the user over chat, and includes a function for transmitting a message such as "please authenticate" to the user when authentication has not been performed, for example. In addition, the message control unit 3022 also performs a process of issuing a guidance when an input relating to a usage method is received, such as a help.

Figure 15:
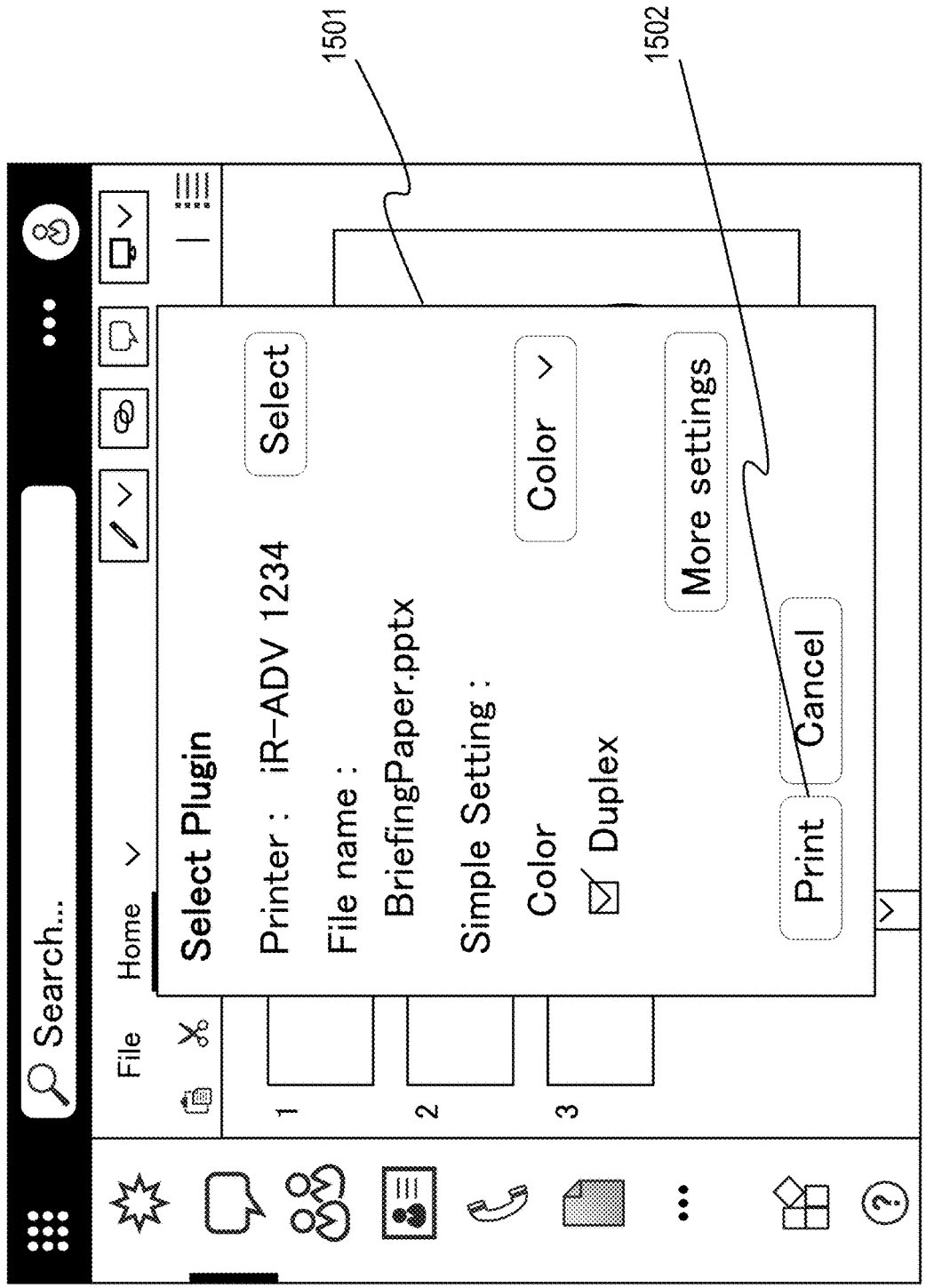
FIG. 15 illustrates a print setting card popup.

A print message control unit 3023 receives conversion of data necessary for printing and input (setting and specification of a print file) from a user. The print message control unit 3023 generates and transmits a message card including a control for setting print settings, such as the popup of a print setting card 1501 shown in FIG. 15. The print message control unit 3023 also calls and transmits a print process message to the external service.

Next, the authentication service 303 will be described.

The CPU of one or more computers implementing the authentication service 303 reads and executes a program stored in the storage device to realize the following functions and operations of the authentication service 303.

An authentication processing unit 3031 authenticates the user by using an authentication method including an ID, a password, face and fingerprint authentication, and pattern authentication from the user.

An authentication information management unit 3032 manages authentication information about which organization and which group the user belongs to and what authority is given to which user, and assigns appropriate access rights to files and storages corresponding to the given authority. The authentication information management unit 3032 may also manage license information purchased by the user and assign the use authority of software, plugins and services based on the grade information of the purchased subscription.

Finally, the cloud print service 304 will be described.

The CPU of one or more computers implementing the cloud print service 304 reads and executes a program stored in the storage device to realize the following functions and operations of the cloud print service 304.

The printer management unit 3041 performs processing for transmitting a list of printers according to the scope managed by the requested user or group. The printer management unit 3041 also manages printer capability information (information on both sides, colors, etc.), text information such as an explanation sentence or supplement of a manager, and position data including GPS and address information, and transmits information in response to a request from the user or the group. This information is updated by acquiring the information from the printer or by manually editing the information by the user.

An account management unit 3042 manages information on which user or group manages the printer and which user or group shares the printer.

A print processing unit 3043 manages print settings, converts data for each service, and converts data into print data, such as rendering a file, as needed.

Next, a printing example using the print plugin of the present embodiment will be described with reference to FIG. 8, and a method of starting an application on the business chat service 301 as a premise will be supplemented with reference to FIGS. 9 to 11.

Figure 9:
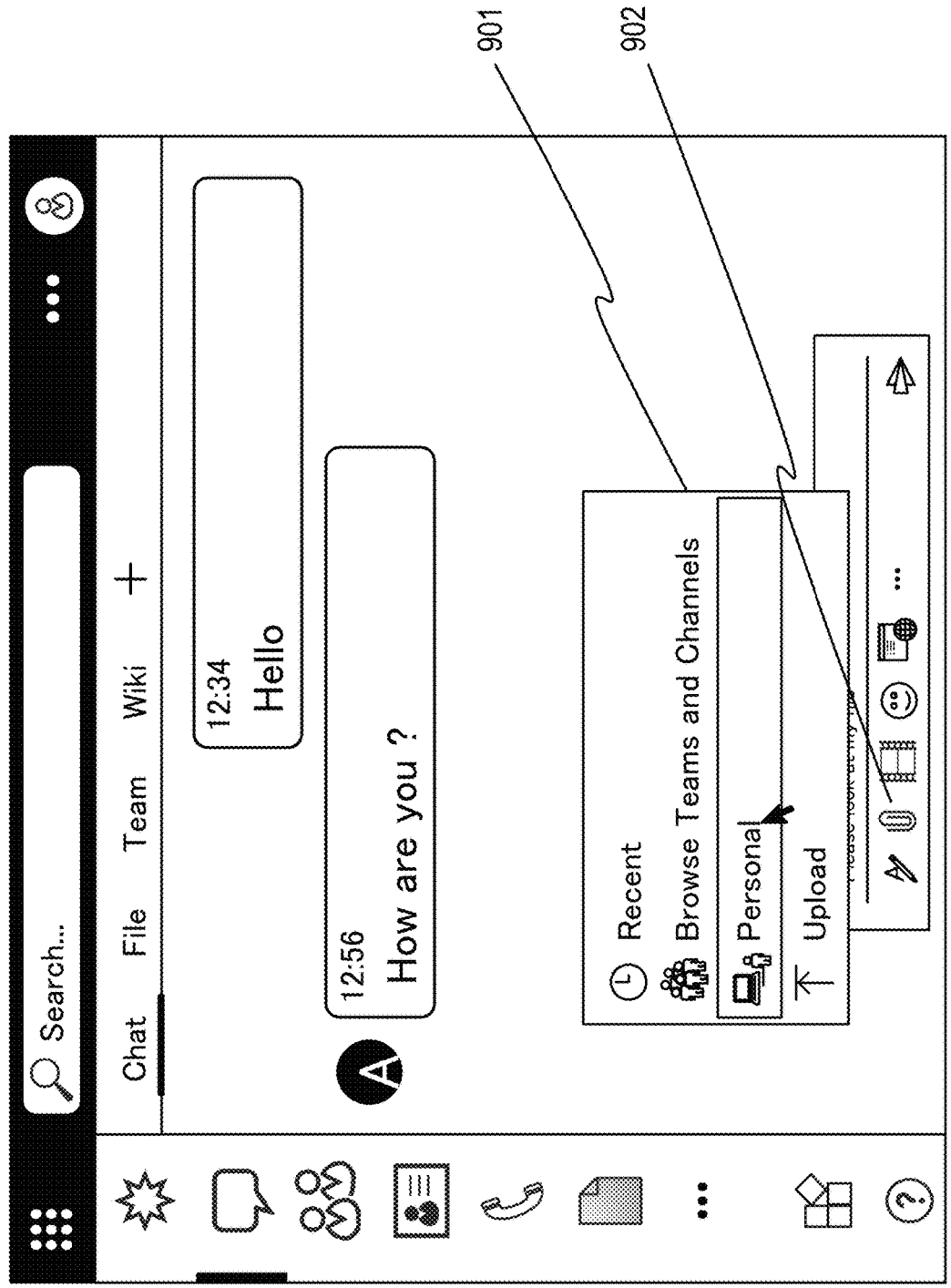
FIG. 9 illustrates a file attachment screen of the business chat service.

FIGS. 9 to 11 illustrate screens of the business chat service 301.

When the business chat service 301 performs the chat, a file attachment button 902 in the message input area of FIG. 9 is pressed, an object file is selected from a file attachment menu 901, and the file is attached to the message. In the example shown in FIG. 9, "recently used file", "team or channel", "personal storage", and "upload from local computer" are displayed on the file attachment menu 901. However, the file attachment menu 901 may also include a menu for uploading a file from a cloud storage service (not shown) or specifying a file by directly entering a URL in text.

When the file is attached, the attached file is displayed as an attached file 1009 in FIG. 10. By clicking the attached file 1009, the file is opened in the related application, and the state is changed to an editable state as shown in FIG. 11. In the present embodiment, the application is opened to fit within the frame of the business chat service 301, but if the information related to the business chat service 301 is carried over, the state of the display does not matter. Concretely, even if the application is displayed in a popup window as a separate frame in the window frame or opened and displayed in a different tab or window, it is sufficient that the information such as a message can be exchanged with the business chat service 301.

An example of printing using a print plugin will be described below with reference to FIG. 8.

Figure 8:
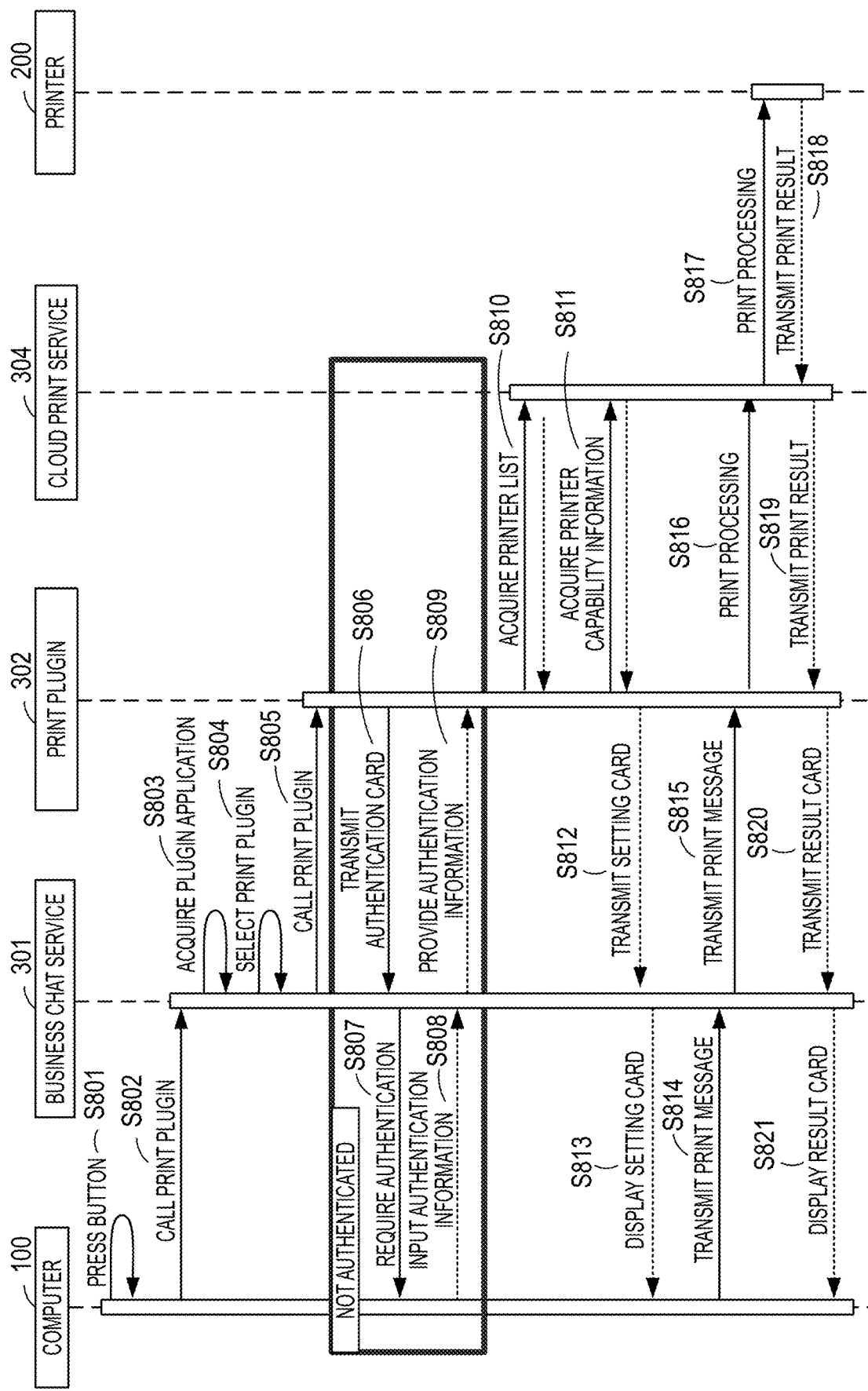
FIG. 8 illustrates a sequence diagram of a process of printing a file opened by an application launched from the business chat service from the print plugin.

FIG. 8 is a sequence diagram for explaining a process of printing a file opened by an application started from the business chat service 301 via the print plugin 302.

FIGS. 12 to 15 illustrate a screen of the business chat service 301 when printing via the print plugin 302.

Figure 12:
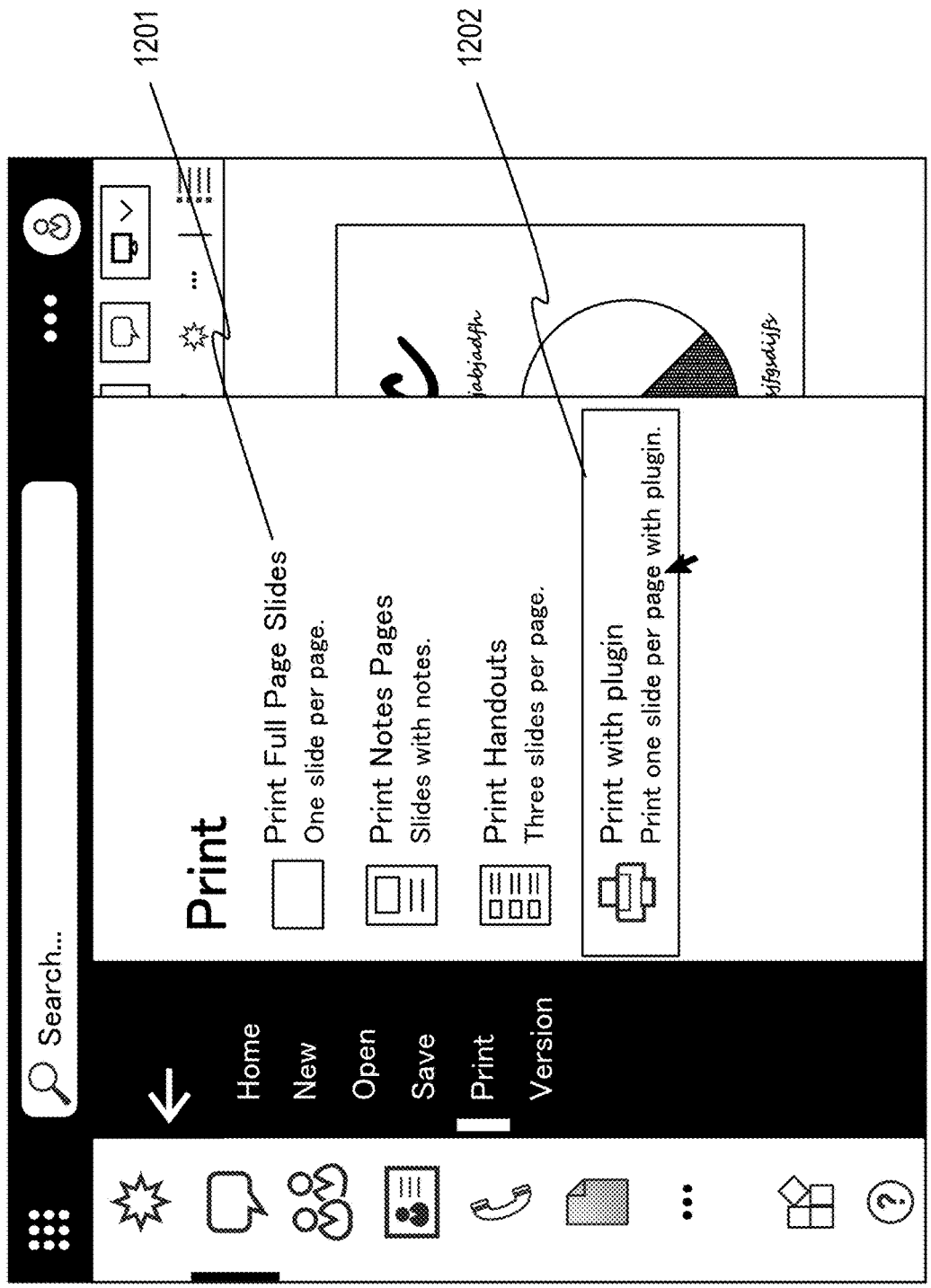
FIG. 12 illustrates a print menu of the application.
Figure 13:
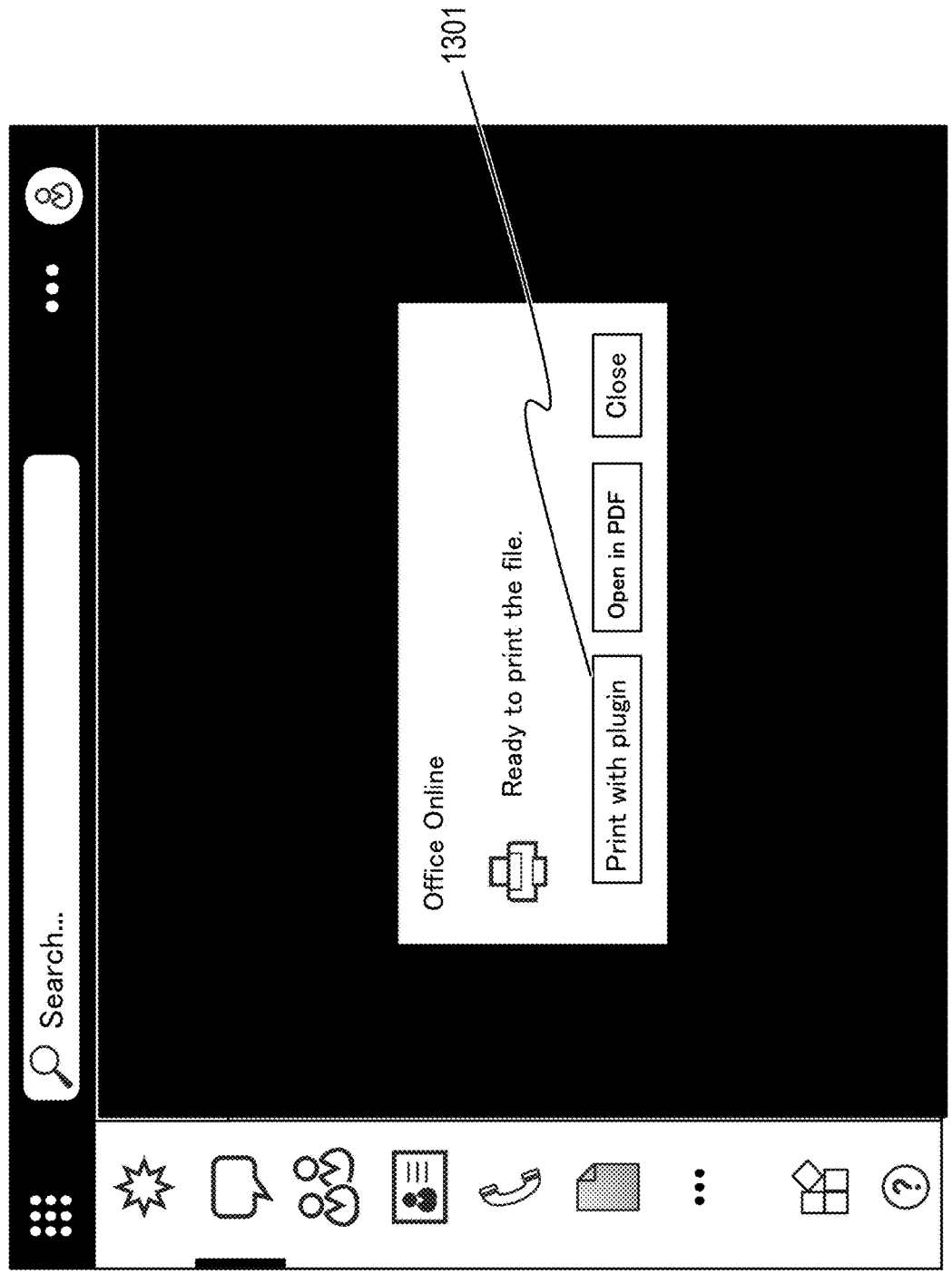
FIG. 13 illustrates a print popup of the application.

The user accesses the business chat service 301 from the computer 100 to perform the work. The user selects the menu of the file on the application started from the business chat service 301 and presses a plugin call button 1202 on the print menu as shown in FIG. 12 (S801). The plugin call button in this process may be a button 1202 on the print menu or a plugin call button 1301 on the print confirmation popup shown in FIG. 13, which is displayed when the normal print button 1201 is pressed, may be pressed. When the application is started from the business chat service 301, the external process control unit 3016 instructs the application to display the plugin call buttons 1202 and 1301. The plugin call button 1202 and 1301 are added to the print menu and the popup based on the instruction. However, the application to be started from the business chat service 301 may have plugin call buttons 1202 and 1301 by default. The fact that the plugin call buttons 1202 and 1301 are pressed is reported to the business chat service 301 via the external process control unit 3016. Thus, the plugin can be called through the user interface related to the printing function of the application (cooperating) operating in the business chat service.

When the user presses the plugin call button 1202, the business chat service 301 determines that a request to call a print plugin has been made (S802).

The business chat service 301 receiving the call request of the print plugin acquires the plugin held by the user who made the request and the group to which the user belongs (S803). Detailed processing such as extraction of a print plugin will be described later in FIG. 16.

If there are a plurality of items corresponding to the print plugin 302 in step S803, the business chat service 301 performs plugin selection processing to determine the object to be used (step S804). As a method of selecting a plugin, the plugins are listed up and selected by the user as the plugin selection popup 1401 shown in FIG. 14. Since only print plugins available to the corresponding user are listed as choices, the user can easily select a plugin. As a method of selecting a plugin, a method specified as a default or a group policy may be forcibly selected.

Further, a target plugin may be defined in advance according to the type of the document (file), such as "this plugin for office documents", "this plugin for drafting files", and automatically selected. If there is only one extracted print plugin, the step S804 may be skipped.

When the print plugin to be called is determined, the business chat service 301 calls the target print plugin 302 (S805).

The called print plugin 302 executes a process for obtaining authentication information (S806 to S809). The authentication information is to be used by the print plugin for obtaining information from the cloud print service 304. The print plugin 302 causes the business chat service 301 to display an authentication card for receiving user identification information. The business chat service 301 receives the user identification information and transmits the received user identification information to the authentication service 303. The business chat service 301 receives the authentication information, in a case where the authentication based on the received user identification is successful. The business chat service 301 transmits the authentication information to the print plugin 302.

Note that this process may be skipped if the print plugin 302 has the authentication information. Further, when authentication by different accounts is required for each target processing, for example, when different accounts are registered for cloud storage and cloud print service, authentication is performed multiple times for each account. These processes may be executed not at this timing but at the timing of actually executing the processes.

Regarding authentication processing, first, the print plugin 302 generates an authentication card for performing authentication processing such as inputting a user name and a password (S806), and the card is displayed on the business chat service 301 to input user identification information from the user (S807). When the user inputs the user identification information (S808) and the print plugin 302 transmits the input user identification information to the authentication service 303. And the print plugin 302 receives a result of authentication from the authentication service 303. In a case where the authentication is successful, the business chat service 301 receives authentication information such as passing an authentication token from the authentication service 303 and transmits the authentication information to the print plugin 302 (S809).

The print plugin 302 to which the authentication information has been given requests the cloud print service 304 to acquire a list of printers that can be used by the authority of the authenticated user (S810).

After the printer list is acquired, the print plugin 302 inquires of the cloud print service 304 capability information of a printer selected from the list and receives the capability information of the selected printer (S811). Further, the print plugin 302 transmits the print setting card 1501 (FIG. 15) corresponding to the acquired capability to the business chat service 301 (S812), and the business chat service 301 displays (presents) the print setting card 1501 to the user (S813).

When the user presses the print button of the print setting card 1501 (S814), the business chat service 301 transmits the information of the file to be printed and the data set by the print setting card 1501 to the print plugin 302 (S815). The print plugin 302 receives the print setting card 1501 and transmits a print job to the cloud print service 304 (S816), and the cloud print service 304 prints by using the printer 200 (S817).

Thereafter, the cloud print service 304 receives a message or an error code indicating whether printing succeeded or failed as a printing result from the printer 200 (S818), and transmits the printing result to the print plugin 302 (S819).

The print plugin 302 transmits the received print result to the business chat service 301 as required (S820). The business chat service 301 notifies the user of the received print result (S821).

By performing the above processing, printing can be performed from an application on the business chat service 301. That is, printing can be performed by accessing a target print plugin without switching a screen from an application linked on the business chat service.

Figure 16:
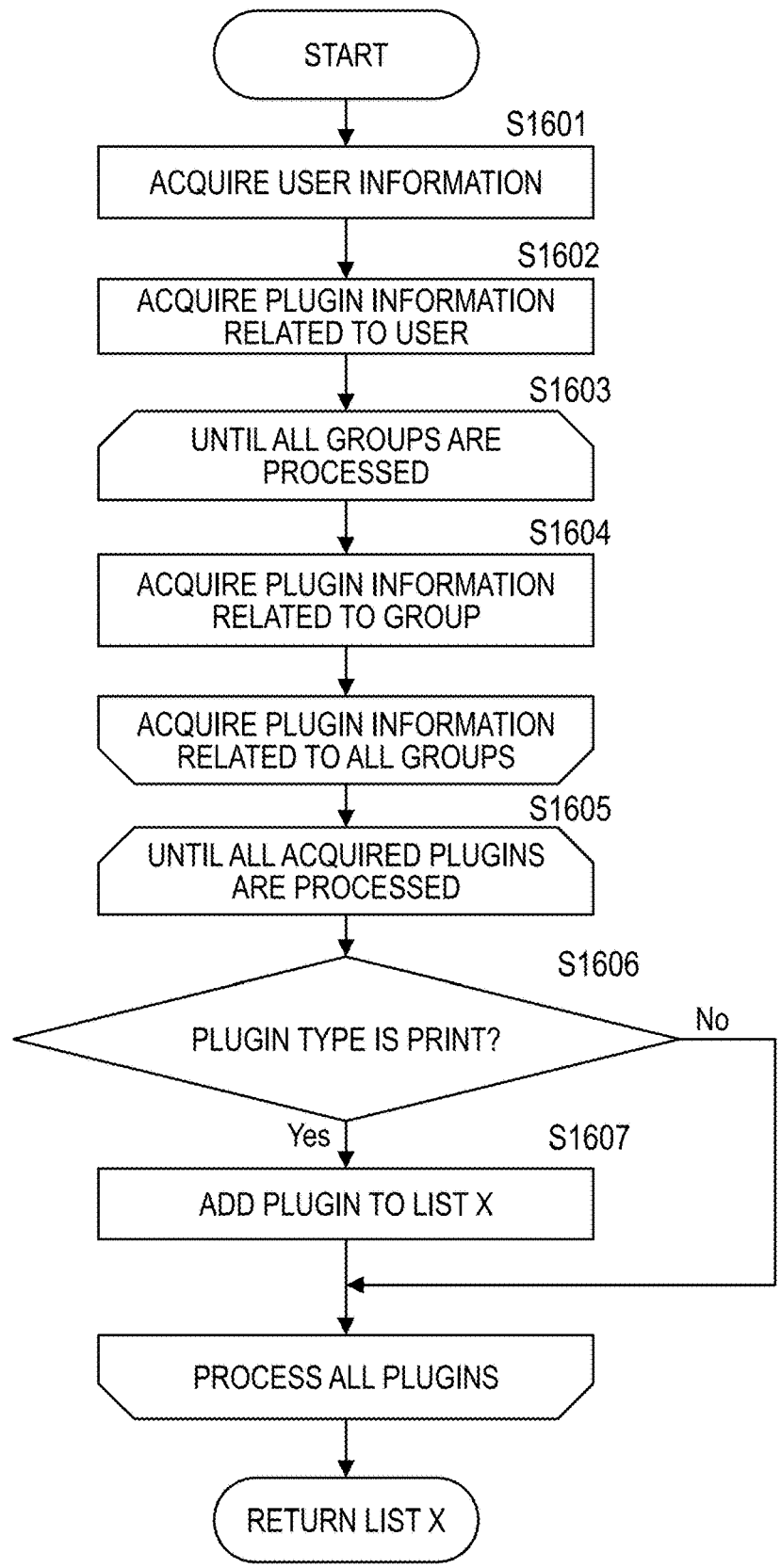
FIG. 16 illustrates a flowchart of a process for acquiring the print plugin available to a user.

FIG. 16 is a flowchart showing an example of processing in which the business chat service 301 acquires a print plugin usable by a user. The processing of this flowchart is called at any timing, for example, when an application using the print plugin is started or when a menu for printing is called. Specifically, the processing is called when the plugin call button 1202 is pressed in the application menu on the business chat of FIG. 12. Alternatively, the processing may be called when the plugin call button 1301 on the popup shown in FIG. 13, which is displayed after the print button 1201 is pressed, is pressed. In addition, when the business chat service 301 is started, the processing may be called in the background to acquire a result at any timing. In this case, when there is no target plugin, the plugin call button 1202 of FIG. 12 or the button of the plugin call button 1301 of FIG. 13 for calling the plugin is grayed-out or shown/hidden. For example, when an application is started from the business chat service 301, the external process control unit 3016 instructs the application to gray-out or switch to show/hide the plugin call buttons 1202 and 1301.

In step S1601, the business chat service 301 acquires user information for reading the plugin information of the corresponding user. In the present embodiment, the acquisition of the IDs of the users on the business chat service 301 and all the groups to which the users belong is targeted, but if the user information is stored in the external authentication service 303 or the like, the acquisition is performed from the external authentication service 303.

After acquiring user information, the business chat service 301 acquires user plugin information (FIG. 5) (S1602). Here, all plugin information associated with the user or the group or channel to which the user belongs in the user information management unit 3011 of the business chat service 301 are acquired as an object.

When the acquisition of the plugin information of the user is completed, the business chat service 301 acquires the plugin information (FIG. 5) of all the groups to which the user belongs (S1603 to S1604). In this case, the group to be acquired may be all the groups in which the user is registered, or may be all the related groups at the timing when the user calls them, such as a group to which messages are posted in chat.

Since the plugin information acquired at this point is all the plugin information including not only the print plugin, the print plugin is extracted from all the plugin information (S1605 to S1607). In this example, the business chat service 301 determines that the plugin type 501 registered in the plugin definition file (FIG. 5) is "print" as a print plugin (S1606). Further, the business chat service 301 stores the plugin information determined as the print plugin in a temporary area as a list (S1607). This processing is performed for all the acquired plugins.

At the end of this flowchart, the business chat service 301 returns a list of all the plugin information stored in the above step S1607.

By performing the above processing, it is possible to extract a print plugin corresponding to a user. By this processing, the related print plugin can be acquired, and when the related plugin information does not exist, the related control including the plugin call button 1202 in FIG. 12 can be appropriately controlled.

Figure 17:
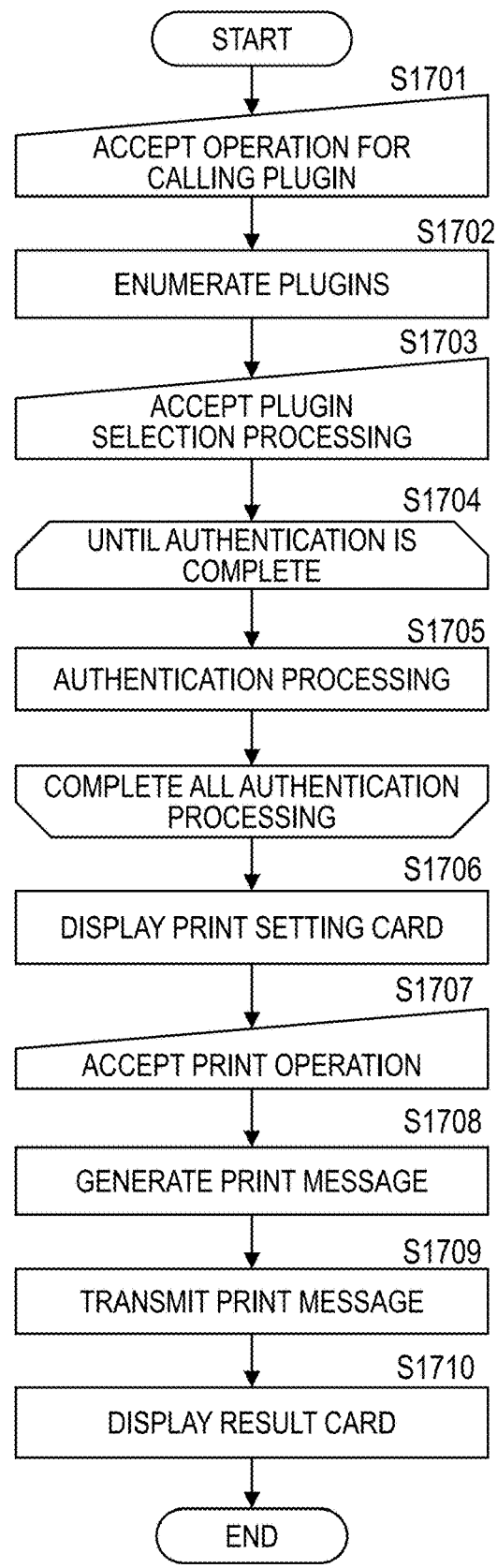
FIG. 17 illustrates a flowchart of an operation of executing print processing by calling the print plugin from the application linked with the business chat service.

FIG. 17 is a flowchart for explaining an operation of calling the print plugin 302 from an application cooperating with the business chat service 301 to perform printing processing.

First, the business chat service 301 receives a call operation of a print plugin from a print menu or the like of a cooperating application (S1701). Specifically, this corresponds to a process in which the plugin call button 1202 of FIG. 12 is pressed or the plugin call button 1301 of FIG. 13 displayed after executing the print button 1201 is pressed.

Figure 14:
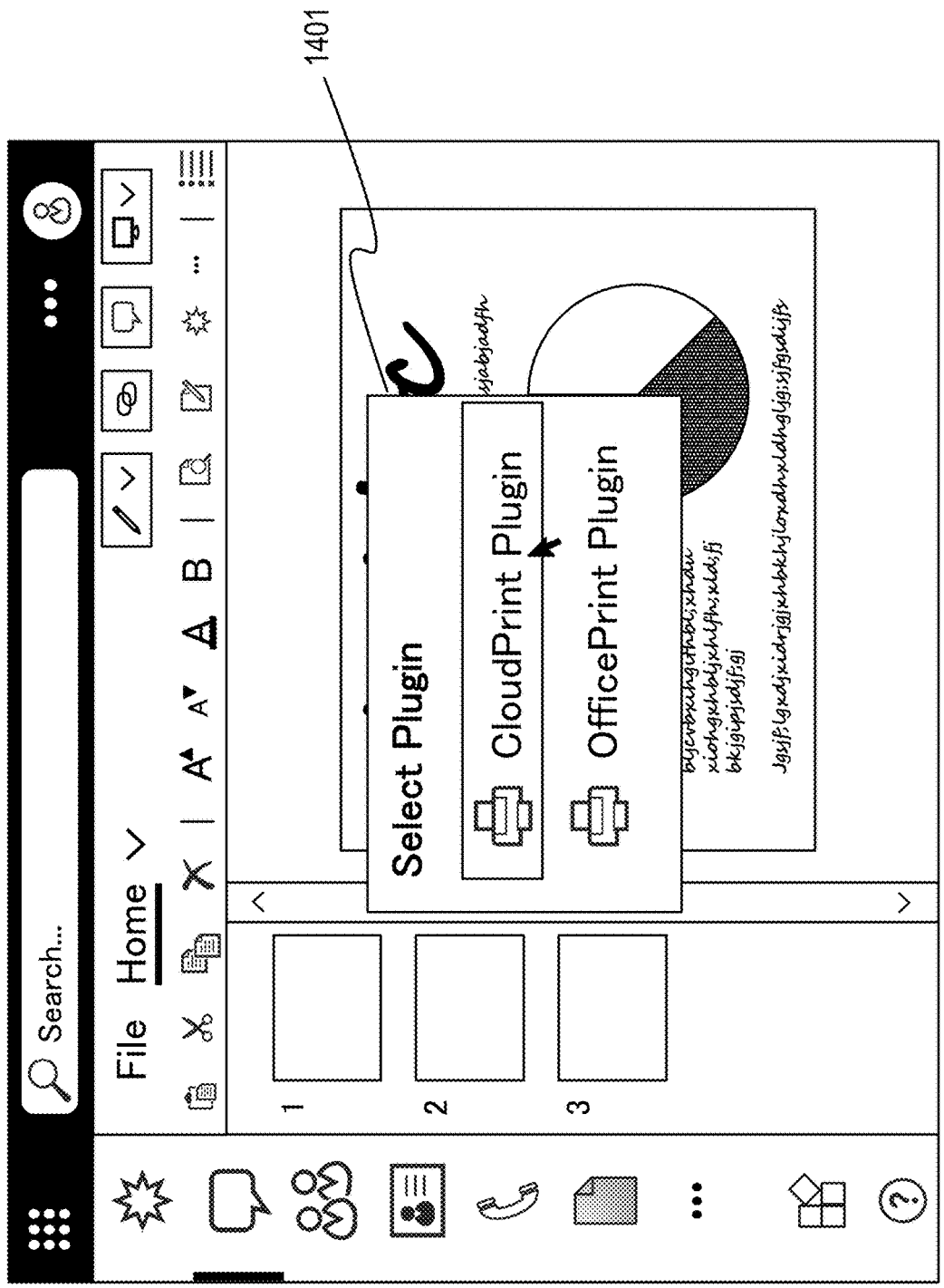
FIG. 14 illustrates the print plugin selection popup.

After the plugin call operation is performed, the business chat service 301 performs the print plugin acquisition processing shown in FIG. 16, and then enumerates the acquired plugins as a plugin selection popup 1401 as shown in FIG. 14 (S1702). The print plugin acquisition process shown in FIG. 16 may be performed at this timing, or the acquired result may be used.

Thereafter, the business chat service 301 accepts the selection operation of the enumerated print plugin (S1703). Since only print plugins available to the user are listed as choices, the user can easily select a plugin. When only one print plugin is targeted, the enumeration and the request/acceptance of selection processing to the user may be omitted.

When the selection of the print plugin is completed, the business chat service 301 calls the selected print plugin, and moves to the information acquisition for displaying the print setting card 1501 and the authentication processing necessary therefor.

In order for the print plugin 302 to acquire authorization for acquiring the same authority as that of the calling business chat service 301 or to acquire operation authority for the cloud print service 304, authentication processing is performed only as much as necessary for the authentication service 303. The business chat service 301 performs the authentication processing until all authentication is completed (S1704 and S1705). In this case, if the file to be printed is in the external cloud storage, the authentication processing may be performed to acquire the access right to the cloud storage. If the account can use the common authentication information, the second and subsequent authentication may be omitted. If the authentication information is already authenticated by the browser or the business chat service 301 and can be used, or if the previous authentication information is within the expiration date, the input request to the user may be omitted and the acquired authentication information may be used. When the authentication is completed, the business chat service 301 gives authentication information such as an authentication token to the print plugin 302.

After full authentication, the print plugin 302 acquires information necessary for displaying the print setting card 1501 in the business chat service 301. The print plugin 302 acquires the capability information of the selected target printer from the cloud print service 304 and switches to show/hide the control such as double-sided and color, if necessary. In this case, if the default value is acquired, the acquisition is performed and the initial value of the print setting is changed. It is determined whether the file can be read (printable) from the information of the file to be printed, and all the printable files are enumerated.

In this case, if the setting information for printing is stored in the file, the file may be acquired to apply the setting. The print plugin 302 acquires the information, applies the necessary settings, generates the print setting card 1501, and transmits the print setting card 1501 to the business chat service 301. The business chat service 301 displays the print setting card 1501 received from the print plugin 302 (S1706). That is, the print setting screen is presented to the user, and print settings and print instructions are received.

Next, in response to the user pressing the print button 1502 of the print setting card 1501 (S1707), the business chat service 301 executes a print message generation process (S1708). Here, the data of a file to be printed and print settings set on the print setting card 1501 are acquired, and input data necessary for printing is generated. Note that the file to be printed may be an entity of the file, but may also be an ID that can uniquely identify the file or a URI on a network. When the print settings exist on another service, the print settings may be acquired from all the target services, merged, and applied.

After generating a message for printing, the business chat service 301 transmits a message for printing (i.e., a print instruction) to the print plugin 302 (S1709).

The print plugin 302 transmits a print job to the cloud print service 304 based on the contents of the transmitted message for printing. Based on the print job, the print processing unit 3043 on the cloud print service 304 performs data conversion including rendering of print data and inputs the print job to the printer 200.

The cloud print service 304 transmits a print result such as "Success" to the print plugin 302 based on the print result. The print plugin 302 generates a print result card based on the print result and transmits the print result card to the business chat service 301. The business chat service 301 displays (presents to the user) the result card received from the print plugin 302 (S1710).

As described above, in response to an operation such as a print menu of an application linked to the business chat service 301, an available print plugin is called and print processing using the cloud print service 304 is executed via the print plugin 302. Thus, a target print plugin can be accessed without switching a screen from an application cooperating on a service having a file sharing function such as a business chat system, and a file shared by the service can be easily printed.

Second Embodiment

In the processing of the first embodiment, the configuration has been described in which a print plugin is made to perform printing processing from an application operating within the business chat service. Once the application is running inside the business chat service, users will have to switch screens for chat and web conferencing to work. Also, even when the screens are displayed in parallel, the display may be reduced because the screens are displayed side by side. For this reason, the user may want to open a file shared with the business chat service outside of the business chat service.

There are several ways to open a file shared with the business chat service outside of the business chat service. For example, a file may be opened using a separate window or tab in a Web browser as a Web application or a desktop application outside of a Web browser separate from the business chat, and viewed and edited. An example of an application starting method will be described below with reference to FIG. 10.

Figure 18:
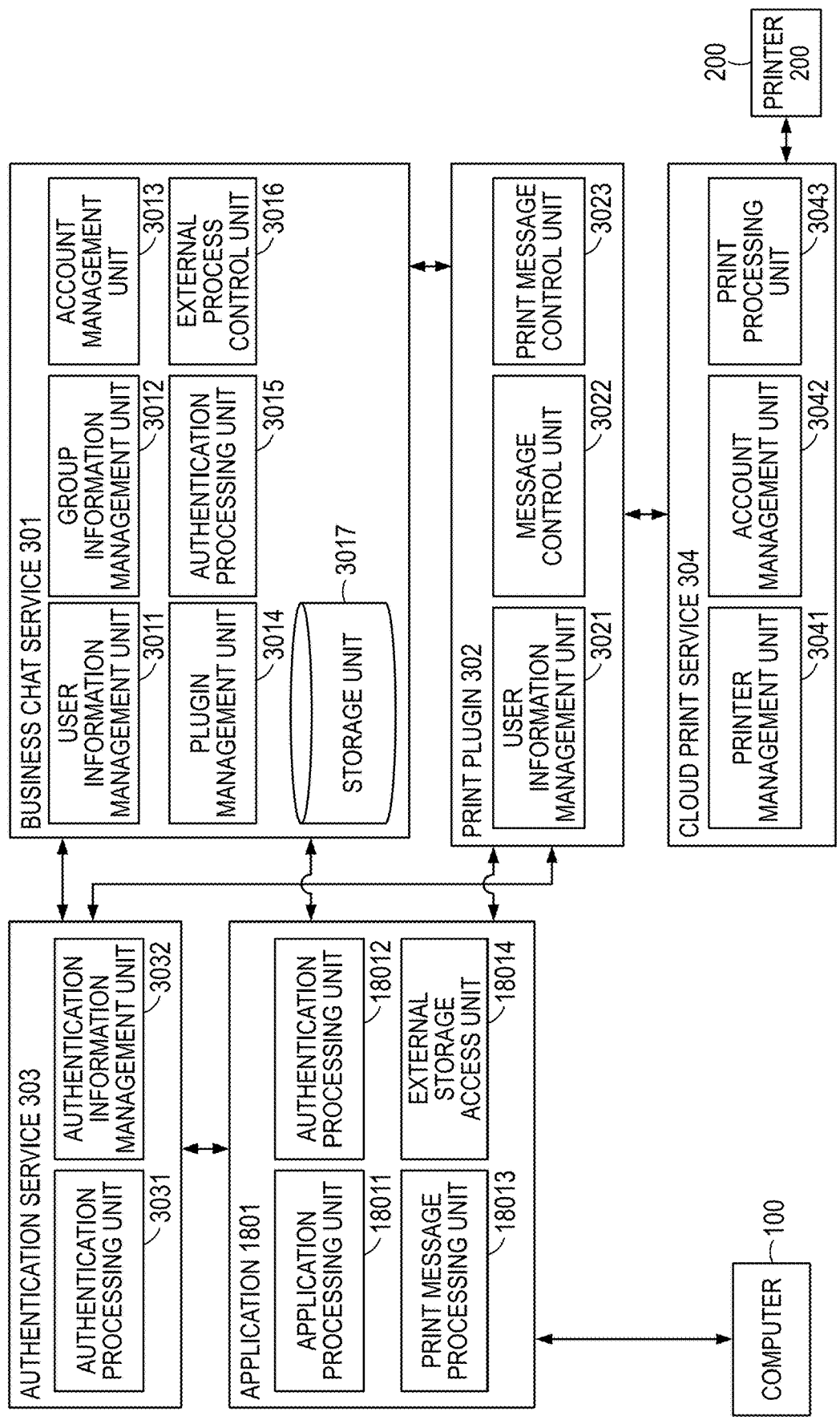
FIG. 18 illustrates an exemplary configuration of a system for opening a file shared by the business chat service from an external application and printing the file from the print plugin.
Figure 19:
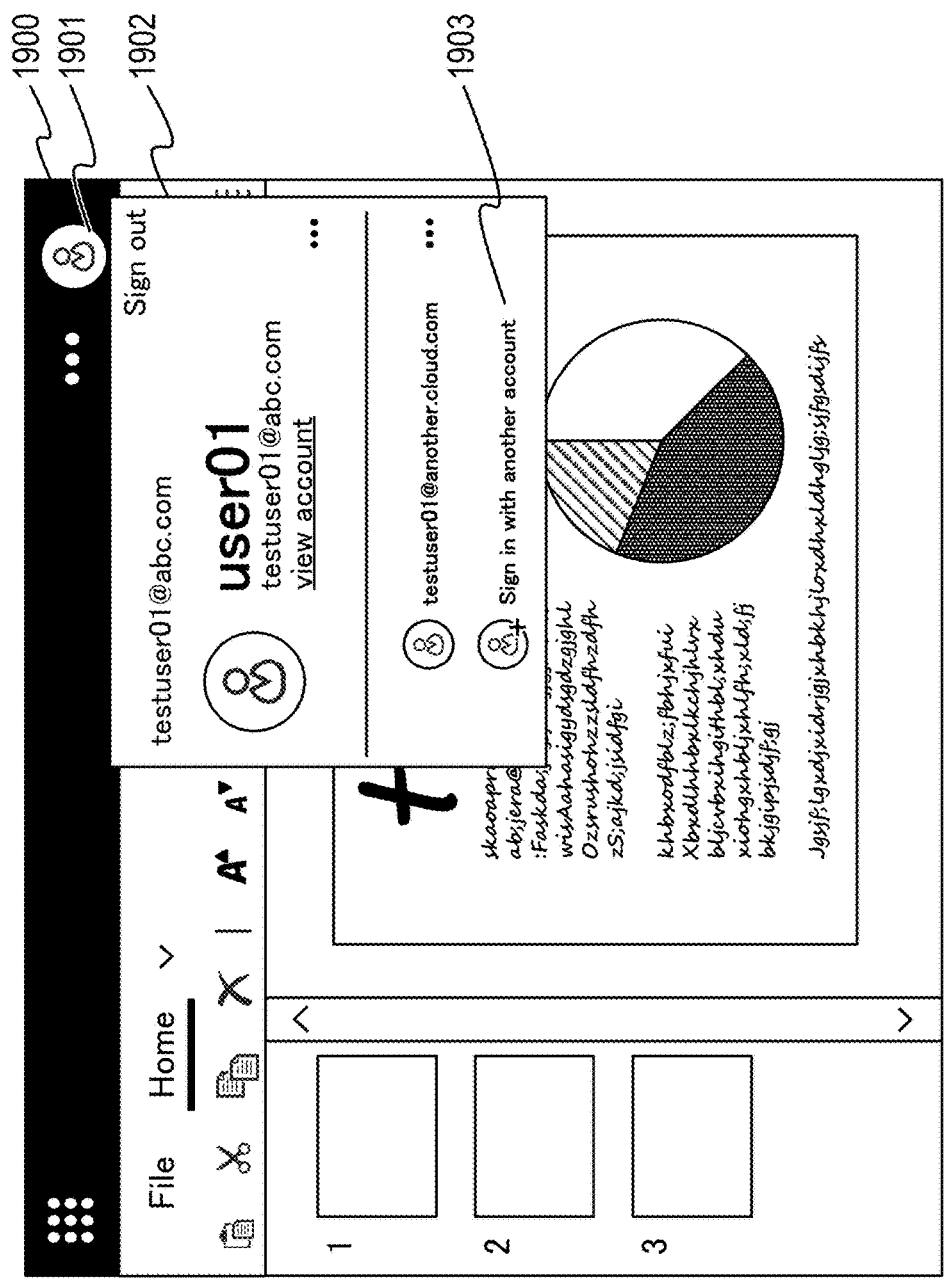
FIG. 19 illustrates an operation screen of the external application.

As an example of the starting method, an external application (hereinafter referred to as "external application") 1801 shown in FIGS. 18 and 19 is called by calling up a menu from three dots 1010 of the attached file 1009 in FIG. 10 and selecting a menu 1011.

FIG. 18 is a diagram illustrating a configuration of a system for opening a file shared by the business chat service from an external application and printing the file from the print plugin.

FIG. 19 is a diagram illustrating an operation screen of an external application.

The external application 1801 is an application that operates outside the business chat service 301. The external application 1801 refers to an application such as Microsoft Office running on a web browser running in a process different from the business chat service 301, or an application running locally. As a specific example, Office Online (registered trademark) of Microsoft 365 (registered trademark) (Office 365 (registered trademark)), Google Office Suite (registered trademark) and the like operate on a Web browser. Applications that run locally include Microsoft Office (registered trademark) and LibreOffice (registered trademark). An application that runs on a Web browser is also referred to as a "Web application", and an application that runs locally is referred to as a "local application", "a native application", or "a desktop application".

As shown in FIG. 18, the external application 1801 includes an application processing unit 18011, an authentication processing unit 18012, a print message processing unit 18013, an external storage access unit 18014, and the like. In the external application 1801, the application processing unit 18011 controls the entire external application 1801 and displays a screen 1900 as shown in FIG. 19. The authentication processing unit 18012 displays an account management screen 1902 of FIG. 19 and authenticates the user. The print message processing unit 18013 receives user inputs required for printing based on the print setting card transmitted from the print plugin 302, and transmits a print message to the print plugin 302. The external storage access unit 18014 controls access to the external storage.

The screen 1900 of the external application 1801 shown in FIG. 19 has basically the same configuration as that operated on the business chat service 301 as described in FIG. 11, although the screen 1900 does not show the business chat specific control such as "chat" or "call".

Although the external application 1801 naturally has functions specific to the local application, the description will be made on the assumption that the external application 1801 has functions equivalent to those operated on the business chat service 301. In the present embodiment, the external application 1801 operating in the local environment is described as an example, but the same applies to the Web application 18010 in FIG. 2 existing in the network 1061.

In the first embodiment, the application 1051 and the print plugin 302 operate in the same business chat service 301. Therefore, when the application causes the print plugin 302 to perform processing, the application 1051 shares access permission and execution permission for services and resources based on authorization.

However, the external application 1801 operating outside the business chat service 301 may be operating under a different account from the business chat service 301, or may not be logged in at all. Therefore, the user must explicitly log in to the external application 1801 with an account that can access the print plugin 302. For example, it is sufficient that the appropriate permission is enabled on the account management screen 1902 that is called by clicking an icon 1901 of the account on the upper right of the screen 1900 of the external application 1801 in FIG. 19. Otherwise, by switching to another account that has already been logged in or by pressing a sign-in menu 1903, an authentication card 2001 shown in FIG. 20 is called to switch to the appropriate authority.

Figure 20:
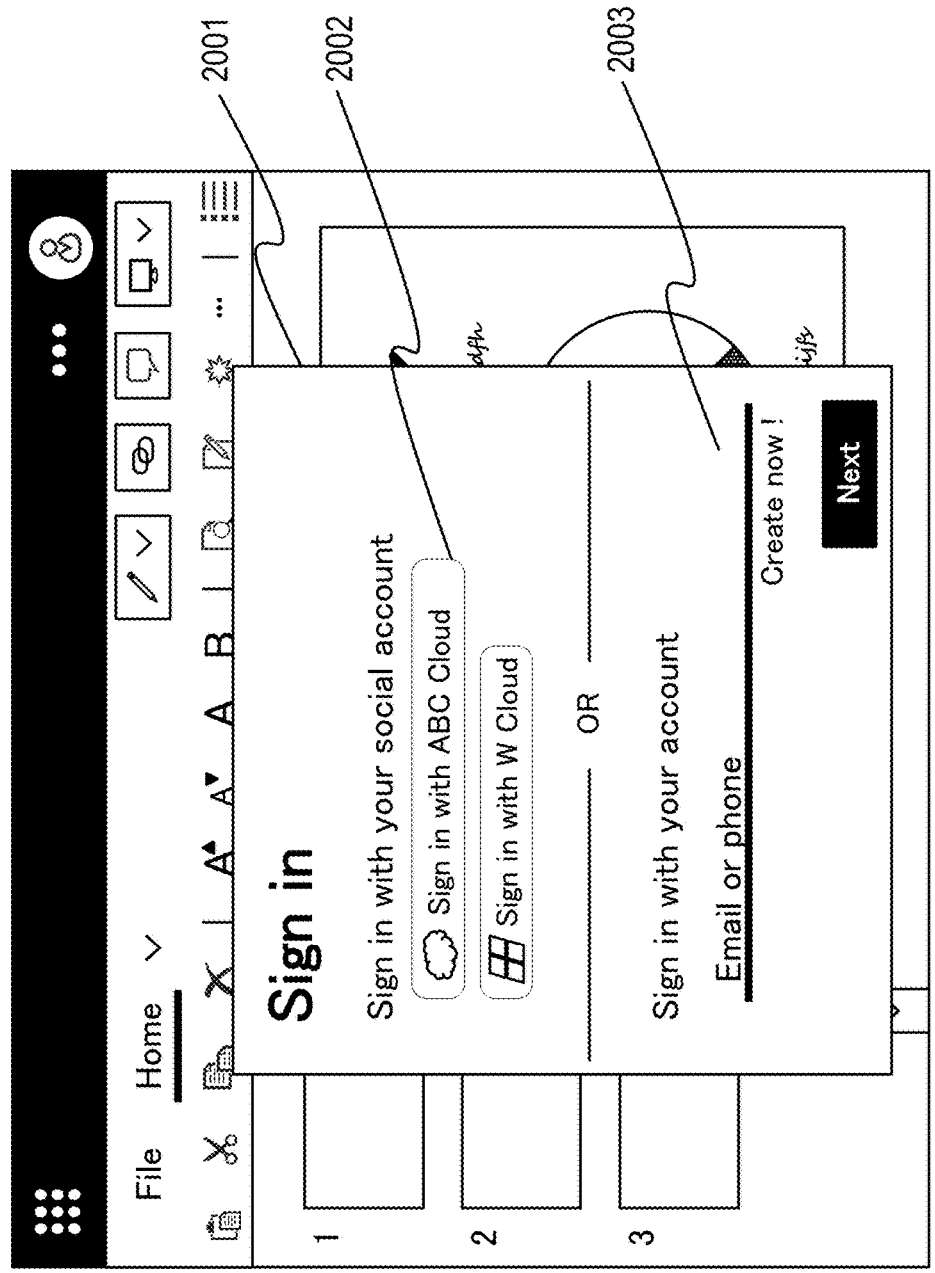
FIG. 20 illustrates a popup of an authentication card on the external application.

FIG. 20 illustrates a popup of the authentication card on the external application.

As a supplement, the login to the account may be performed in advance, or the login process may be called when necessary.

If the external application 1801 and the business chat service 301 can use a scheme such as a third-party OpenID in common, the authentication service may be called from a button of an external authentication service 2002. Alternatively, the authentication may be performed by manually inputting the user ID in a text box 2003 for inputting the account information. As described above, the external application 1801 can cause the print plugin 302 to execute print processing via the external authentication service 2002.

The process of printing from the external application 1801 will be described below. It is assumed that the external application 1801 has a function of directly issuing an instruction to the print plugin 302 to optimize the processing. For example, it is assumed that the print message processing unit 18013 shown in FIG. 18 corresponds to this function. This function is assumed to have the message response portion of the business chat service 301 and the minimum function of performing processing related to or equivalent to the message of the print instruction.

This function may be preinstalled in the external application 1801 or may be installed as an add-on. Using this function, the external application 1801 instructs the print plugin 302 to perform printing. On the other hand, the print plugin 302 is dynamically added (or activated) to the business chat service 301 later, and a plurality of types of plugins prepared separately from each other by the print vendor are targeted. Therefore, in the initial state, the external application 1801 does not have access destination information such as the name and URI of the plugin required to access the print plugin 302. Therefore, the external application 1801 first acquires the list by inquiring the business chat service 301 about the print plugin 302 that can be used by the user individually or by the access authority of the team to which the user belongs. In this case, the inquiry (request for calling the print plugin) may be made to the directory service that manages the information of the business chat service 301. After the print plugin 302 is acquired in this way, a message for printing is issued from the external application 1801, and printing processing is executed.

Hereinafter, description will be made with reference to FIG. 21.

Figure 21:
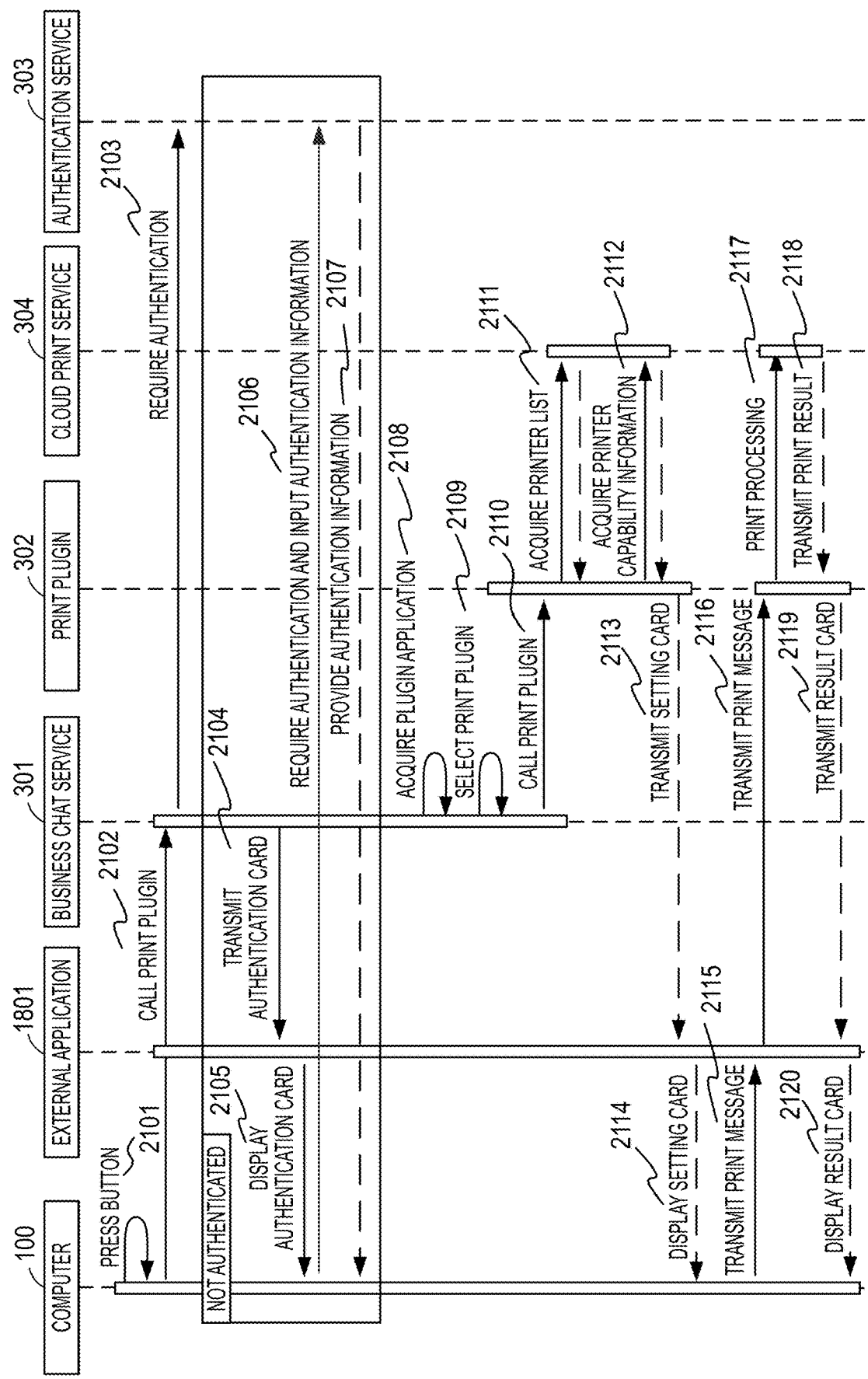
FIG. 21 illustrates a sequence diagram of a process for printing a file opened by the external application from the print plugin in the second embodiment.

FIG. 21 is a sequence diagram illustrating a process of printing a file opened by an external application from the print plugin in the second embodiment.

First, the user requests the business chat service 301 to call the print plugin 302 by pressing the same button as the plugin call button 1202 in FIG. 12 in the external application 1801 (S2101 and S2102). More specifically, the user accesses the business chat service 301 from the computer 100 for work. The user selects a file menu or the like from the external application 1801 started outside the business chat service 301, and presses a button (hereinafter referred to as "plugin call button 1202") equivalent to the plugin call button 1202 in FIG. 12 (S2101). In response to pressing the plugin call button 1202, the external application 1801 requests the business chat service 301 to call the print plugin 302 (S2102).

To supplement the internal processing, first, the plugin call button 1202 incorporates an access destination and an instruction for access to the business chat. The contents of such buttons may be pre-built in the external application 1801 or may be incorporated in a form such as an add-on. The access destination to the business chat service 301 may directly specify a specific user or channel of a specific service such as a URI or an ID. In addition, a configuration may be adopted in which information in a specific business chat is specified by combining an instruction for identifying the business chat, such as "https://~/ChatService/App" in a REST API, with the user's authentication information. The external application 1801 can acquire a list of print plugins registered in the business chat service 301 by adding a command for acquiring a list of plugins or specifying conditions to the information. Thus, the plugin can be called via the user interface or the like related to the printing function of the external application 1801 operating outside the business chat service.

The business chat service 301 receiving the call request of the print plugin confirms whether the external application 1801 has the authority necessary for the print plugin 302 with the authentication service 303 (S2103).

If the authentication is not performed (if the authority necessary for the print plugin 302 is not acquired), the business chat service 301 transmits the authentication card to the external application 1801 (S2104). Upon receiving the authentication card, the external application 1801 displays the authentication card 2001 as shown in FIG. 21 on the computer 100 (S2105). It should be noted that a window having the same contents as the authentication card 2001 received from the authentication service 303 may be displayed instead of the authentication card of the business chat service 301.

In response to user input to the authentication card 2001 or the like, the computer 100 inputs user identification information to the business chat service 301 or a third party authentication service (S2106), and receives authentication information (S2107).

When the access right is acquired, the plugin held by the user who can be referred to and the belonging group is acquired from the business chat service 301 under the access right (S2108). The detailed processing including the extraction of the print plugin corresponds to the processing of FIG. 16. If there are a plurality of acquired print plugins, a display such as the plugin selection popup 1401 shown in FIG. 14 is performed, and a selection from the user is accepted (S2109). As in S805 of FIG. 8, the application (file type) may be made to correspond to the print plugin in advance, and the plugin may be automatically called up without the user having to select them. If only one plugin has been acquired, this selection process may be skipped.

When the calling plugin is determined, the business chat service 301 calls the print plugin 302 (S2110).

Thereafter, in order to display the print setting card 1501, the print plugin 302 acquires a list of printers that can be used by the user's authority held by the external application 1801 to the cloud print service 304 (S2111).

After the printer list is acquired, the print plugin 302 makes an inquiry for acquiring capability information of a printer selected from the printer list to the cloud print service 304 to receive the capability information of the selected printer (S2112).

Further, the print plugin 302 generates the print setting card 1501 (FIG. 15) corresponding to the acquired capability, and transmits the generated print setting card 1501 to the external application 1801 (S2113).

The external application 1801 receiving the print setting card 1501 reads the information of the print setting card 1501 and displays (presents) the print setting card to the user (S2114). At this time, if the transmitted print setting card 1501 conforms to the format handled on the business chat service 301, the data is interpreted in the external application 1801 and the necessary control is generated and displayed. Further, the data may be converted into a general format such as an HTML, format by the print plugin 302 and transmitted to the external application 1801.

When the user presses the print button 1502 on the print setting card 1501, the external application 1801 is notified that the print button 1502 is pressed (S2115), and the external application 1801 directly transmits the print message and print data to the print plugin 302 (S2116).

Thereafter, the print plugin 302 transmits a print job to the cloud print service 304, and the cloud print service 304 perform printing via the printer 200 (S2117).

Thereafter, the cloud print service 304 acquires the print result from the printer 200 and transmits the print result to the print plugin 302 (S2118). Upon receiving the print result, the print plugin 302 transmits the print result card to the connection destination to which the print processing has been transmitted (S2119). Finally, the external application 1801 displays the result card (S2120).

By performing the above processing, it is possible to perform printing processing from the external application 1801 by using the print plugin 302. As a result, it is possible to improve the usability by preventing the display from being reduced by switching the screen for operating a chat or a Web conference or by displaying the screen in parallel.

Third Embodiment

In the second embodiment, the print processing from the external application 1801 is directly exchanged with the print plugin 302. In this method, while the processing can be efficiently performed, the external application 1801 needs to have at least the message function and print command function of the business chat service 301. If the external application has such functions, a development cost and a maintenance cost for following the version up of the business chat service 301 and the print plugin 302 after the development are incurred. For this reason, the external application 1801 may communicate with the print plugin 302 via the business chat service 301. This embodiment will be described below.

Figure 22:
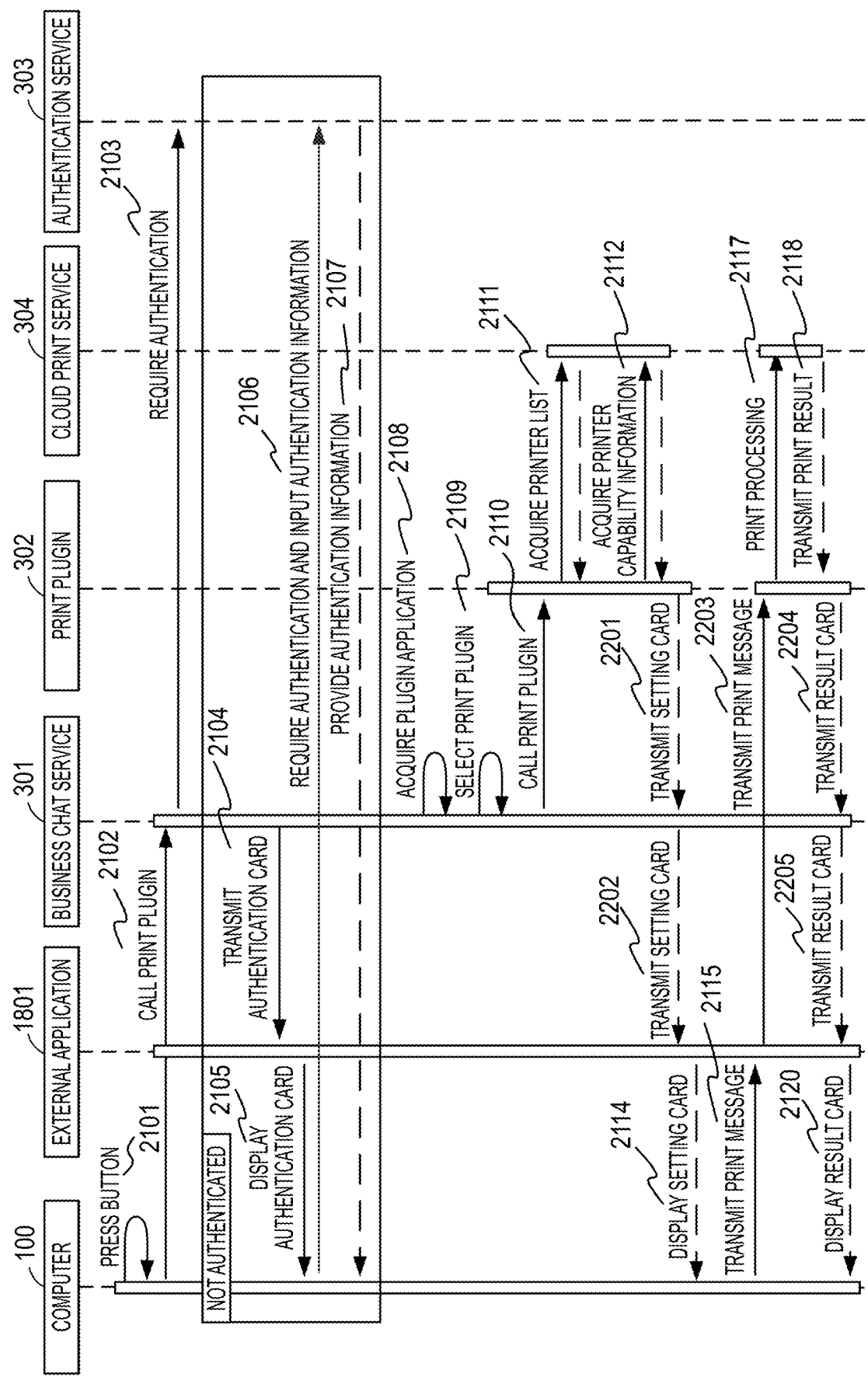
FIG. 22 illustrates a sequence diagram of a process for printing a file opened by the external application from the print plugin in the third embodiment.

FIG. 22 is a sequence diagram for describing a process of printing a file opened by an external application via a print plugin according to the third embodiment, and the same reference numerals are assigned to the same processes as those in FIG. 21.

Specifically, the above-described configuration is realized by incorporating the business chat service 301 into the processing S2113, S2116, and S2119 in which the external application 1801 and the print plugin 302 directly communicate with each other in FIG. 21.

First, the process of receiving the setting card from the print plugin 302 (corresponding to S2113 in FIG. 21) is configured as follows. First, the business chat service 301 receives a setting card from the print plugin 302 and generates the print setting card 1501 according to the contents of the card (S2201). Further, the business chat service 301 transmits the generated print setting card 1501 to the external application 1801 (S2202). The external application 1801 displays the print setting card 1501 transmitted from the business chat service 301 with a function such as a general WebView for displaying HTML content, and provides a setting UI to the user (S2114).

In the process of transmitting a print message to the print plugin 302 (corresponding to S2115 in FIG. 21), the display and control of the contents (controls such as buttons) are basically handled as normal HTML contents. However, the files to be printed will be provided in such a way that the external application WebView can read them if necessary. For example, on the external application 1801 side, the file to be printed is copied to a predetermined area that can be referred to by the WebView in the external application, and by loading the file, the file is transmitted to the print plugin 302 as in normal processing (S2203). In some cases, a method of posting a file to a print plugin by performing POST for a file to be printed that exists locally or on a network from the Web, or a method of inserting a URI of the file to be printed into the HTML content and reading it at the time of printing processing may be adopted.

Finally, the process of displaying the result card of the print plugin 302 (S2119 in FIG. 21) is same as the transmission process of the setting card (S2201 and S2202). For example, the result screen of the business chat service 301 is displayed as HTML content (Web content) by WebView or the like inside the external application 1801. Specifically, the business chat service 301 receives the result card from the print plugin 302 and generates a result card matching the content of the card as HTML content (S2204). The business chat service 301 transmits the generated result card to the external application 1801 (S2205). The external application 1801 displays the result card sent from the business chat service 301 in a general WebView-like function for displaying HTML content (S2120).

By performing the above processing, it is possible to cause the print plugin 302 to perform print processing from the external application 1801 via the business chat service 301.

Further, the development cost and the maintenance cost of the external application can be reduced.

According to the above embodiments, a file shared by a service having a file sharing function, such as a business chat system, can be opened from an application inside or outside the service and easily printed via a target print plugin. Thus, the usability in the case of sharing a file with a service having a file sharing function such as a business chat system can be remarkably improved.

According to the present invention, a file shared by a service having a file sharing function such as a business chat system can be easily printed by accessing a print plugin without switching a screen from an application opening the file.

Other Embodiment

Embodiment(s) of the present invention can also be realized by a computer of a system or apparatus that reads out and executes computer executable instructions (e.g., one or more programs) recorded on a storage medium (which may be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-142452, filed Sep. 1, 2021, Japanese Patent Application No. 2022-049401, filed Mar. 25, 2022, and Japanese Patent Application No. 2022-128221, filed Aug. 10, 2022, which are hereby incorporated by reference herein in their entirety.

What is claimed is:

1. An information processing apparatus including a first application providing a chat service with a file sharing function comprising:
 a memory; and
 at least one processor in communication with the memory, wherein the at least one processor is configured to perform:
  acquiring information of a print plugin that operates on the first application that provides the chat service and adds a print function to the chat service;
  controlling a second application that is different from the first application that provides the chat service to display a screen including an image of a file shared on the chat service;
  receiving selection of a print plugin from one or more print plugins displayed based on the acquired information, the one or more print plugins being displayed on the screen displayed by the second application; and
  requesting, even if authentication for acquiring a necessary permission for using the chat service has been performed, the second application to perform authentication for acquiring a necessary permission for using the print plugin,
 wherein the second application instructs the selected print plugin to print the file whose image is displayed by the second application, and
 wherein the print plugin transmits, to a cloud print service, a print job to print the file displayed by the second application according to the instruction of printing the file.

2. The information processing apparatus according to claim 1, wherein the first application receives a setting screen to set a print setting for performing printing on the cloud print service from the selected print plugin, accepts the print setting via the setting screen, and performs print operation including the print setting.

3. The information processing apparatus according to claim 2, wherein the setting screen is based on a printing apparatus available for the cloud print service.

4. The information processing apparatus according to claim 1,
wherein the at least one processor is further configured to perform receiving information to perform a print setting for performing printing on the cloud print service via the print plugin and providing the application with a setting screen based on the information, and
wherein the first application receives the setting screen, accepts the print setting via the setting screen, and performs print operation including the accepted print setting.

5. The information processing apparatus according to claim 4, wherein the setting screen is provided as web contents.

6. The information processing apparatus according to claim 1, wherein the second application operates on a service different from the chat service and is Microsoft Office®.

7. The information processing apparatus according to claim 1, wherein the print plugin is deployed on the chat service or the chat service is deployed on a communicable computer resource via a network as another service.

8. The information processing apparatus according to claim 1, wherein the selecting includes:
providing a list of the print plugin based on the information of the print plugin acquired in the acquiring; and
receiving a selection of the print plugin from the list.

9. The information processing apparatus according to claim 1, wherein the print plugin is selected according to a type of the file displayed by the first application.

10. The information processing apparatus according to claim 1, wherein the at least one processor is further configured to acquire the information of the print plugin that is able to be used in the chat service, identify a function of the print plugin based on the acquired information, and add the print function to the chat service based on a result of the identification.

11. The information processing apparatus according to claim 1, wherein the at least one processor is further configured to perform necessary authentication on the cloud print service and provide authentication information to the selected print plugin.

12. A control method for controlling an information processing apparatus including a first application providing a chat service with a file sharing function, the control method comprising:
acquiring information of a print plugin that operates on the first application that provides the chat service and adds a print function to the chat service;
controlling a second application that is different from the first application that provides the chat service to display a screen including an image of a file shared on the chat service;
receiving selection of a print plugin from one or more print plugins displayed based on the acquired information, the one or more print plugins being displayed on the screen displayed by the second application; and
requesting, even if authentication for acquiring a necessary permission for using the chat service has been performed, the second application to perform authentication for acquiring a necessary permission for using the print plugin,
wherein the second application instructs the selected print plugin to print the file whose image is displayed by the second application, and
wherein the print plugin transmits, to a cloud print service, a print job to print the file displayed by the second application according to the instruction of printing the file.

* * * * *